(12) United States Patent
Sudo

(10) Patent No.: US 10,630,457 B2
(45) Date of Patent: Apr. 21, 2020

(54) BASE STATION, TERMINAL APPARATUS, RADIO COMMUNICATION SYSTEM, AND COMMUNICATION METHOD

(71) Applicant: PANASONIC CORPORATION, Osaka (JP)

(72) Inventor: Hiroaki Sudo, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 52 days.

(21) Appl. No.: 16/001,438

(22) Filed: Jun. 6, 2018

(65) Prior Publication Data

US 2018/0359074 A1 Dec. 13, 2018

(30) Foreign Application Priority Data

Jun. 8, 2017 (JP) .................................. 2017-113571

(51) Int. Cl.
*H04W 72/02* (2009.01)
*H04L 5/14* (2006.01)
*H04L 5/00* (2006.01)
*H04W 72/04* (2009.01)

(52) U.S. Cl.
CPC .............. *H04L 5/14* (2013.01); *H04L 5/0005* (2013.01); *H04L 5/0092* (2013.01); *H04L 5/1469* (2013.01); *H04W 72/0453* (2013.01); *H04W 72/0466* (2013.01)

(58) Field of Classification Search
CPC ....... H04L 5/14; H04L 5/1469; H04L 5/0092; H04L 5/0005; H04W 72/0453; H04W 72/0466
See application file for complete search history.

(56) References Cited

U.S. PATENT DOCUMENTS

| 9,144,075 B2 * | 9/2015 | Rubin | H04W 72/046 |
| 2004/0114566 A1 * | 6/2004 | Lim | H04L 1/0001 370/349 |
| 2007/0058584 A1 * | 3/2007 | Sutskover | H04B 7/2615 370/330 |
| 2007/0153734 A1 * | 7/2007 | Lee | H04B 7/2606 370/329 |

(Continued)

FOREIGN PATENT DOCUMENTS

JP 2015-165605 9/2015

*Primary Examiner* — Jay P Patel
(74) *Attorney, Agent, or Firm* — Greenblum & Bernstein, P.L.C.

(57) ABSTRACT

The base station performs radio communication of a time-division-duplex scheme with a terminal apparatus, using any of a plurality of channels included in each of a plurality of frequency bands, and includes: a channel selector that selects a plurality of use channels to be used for the radio communication; a transmitter that transmits a downlink signal to the terminal apparatus; and a receiver that receives an uplink signal from the terminal apparatus. The transmitter transmits, using at least one of the plurality of use channels, the downlink signal in a transmission interval of the downlink signal, and the receiver receives the uplink signal in the transmission interval of the downlink signal, using another one of the plurality of use channels that is not adjacent to the at least one of the use channels.

9 Claims, 18 Drawing Sheets

(56) References Cited

U.S. PATENT DOCUMENTS

| | | | |
|---|---|---|---|
| 2010/0150085 A1* | 6/2010 | Ishii | H04W 72/04 |
| | | | 370/329 |
| 2012/0257551 A1* | 10/2012 | Diao | H04W 72/048 |
| | | | 370/280 |
| 2016/0249329 A1* | 8/2016 | Au | H04W 48/00 |
| 2017/0086170 A1 | 3/2017 | Takeda et al. | |
| 2018/0270792 A1* | 9/2018 | Park | H04W 68/04 |
| 2019/0020460 A1* | 1/2019 | Rask | H04L 5/14 |
| 2019/0028246 A1* | 1/2019 | Au | H04L 5/0007 |
| 2019/0044675 A1* | 2/2019 | Li | H04J 11/0076 |
| 2019/0090221 A1* | 3/2019 | Nigam | H04W 72/042 |
| 2019/0098626 A1* | 3/2019 | Yi | H04W 72/02 |
| 2019/0104520 A1* | 4/2019 | Kim | H04W 72/0446 |
| 2019/0159255 A1* | 5/2019 | Zheng | H04L 5/0048 |
| 2019/0165891 A1* | 5/2019 | Iwai | H04L 1/0083 |
| 2019/0174496 A1* | 6/2019 | Li | H04W 72/14 |
| 2019/0182011 A1* | 6/2019 | Li | H04L 1/1854 |
| 2019/0288828 A1* | 9/2019 | Ibrahim | H04L 5/0082 |

\* cited by examiner

BASE STATION, TERMINAL APPARATUS, RADIO COMMUNICATION SYSTEM, AND COMMUNICATION METHOD

CROSS REFERENCE TO RELATED APPLICATIONS

This application is entitled to and claims the benefit of Japanese Patent Application No. 2017-113571, filed on Jun. 8, 2017, and the disclosure of which including the specification, drawings and abstract is incorporated herein by reference in its entirety.

TECHNICAL FIELD

The present disclosure relates to a base station, a terminal apparatus, a radio communication system, and a communication method.

BACKGROUND ART

Field Pick-up Units (FPUs) have been known as apparatuses used for radio communication systems that perform video transmission, such as television live broadcast or emergency broadcast. These FPUs are used for source material transmission in the broadcasting field and each transmit an uplink (UL) signal of main stream information from a mobile station (terminal apparatus) on a live broadcasting side to a base station on a broadcasting station side and transmitting a downlink (DL) signal as feedback information from the base station on the broadcasting, station side to the mobile station on the live broadcasting side. The video captured by a camera is transmitted in files in real time, transmitted from the mobile station to the base station as a UL signal, stored in a storage medium and reproduced.

Furthermore, in order to improve the transmission efficiency, a method for transmitting a UL signal and DL signal using a plurality of frequency channels (hereinafter, each may be referred to as "channel") simultaneously have been under study for FPUs.

In order to improve the transmission efficiency of FPUs, a base station is possibly configured to transmit a DL signal using at least one of the plurality of channels and to receive a UL signal using a channel not transmitting a DL signal in a DL signal transmission interval, in a case where a plurality of channels are used simultaneously.

Patent Literature (hereinafter, referred to as "PTL") 1, for example, discloses a technique using a pattern in which transmission of a DL signal and reception of a UL signal are previously fixed in each slot forming a frame in cellular communication between a base station and a plurality of terminal apparatuses.

CITATION LIST

Patent Literature

PTL 1: Japanese Patent Application Publication No. 2015-165605

SUMMARY OF INVENTION

Technical Problem

The transmission power of a terminal apparatus is however so large in FPUs that simultaneously performing transmission of the DL signal and reception of a UL signal causes inter-channel interference due to leakage to outside of a band in an adjacent, channel receiving the UL signal and and may deteriorate transmission quality (e. g., reception quality of UL signal).

A non-limiting example of the present disclosure provides a base station, a terminal apparatus, a radio communication system, and a communication method each capable of enhancing transmission efficiency and suppressing deterioration of transmission quality.

Solution to Problem

A base station according to an aspect of the present disclosure is a base station that performs radio communication of a time-division-duplex scheme with a terminal apparatus, using any of a plurality of channels included in each of a plurality of frequency bands, the base station including: a channel selector that selects a plurality of use channels to be used for the radio communication; a transmitter that transmits a downlink signal to the terminal apparatus; and a receiver that receives an uplink signal from the terminal apparatus, in which the transmitter transmits the downlink signal in a transmission interval of the downlink signal, using at least one of the plurality of use channels, and the receiver receives the uplink signal in the transmission interval of the downlink signal, using at least another one of the plurality of use channels that is not adjacent to the at least one of the plurality of use channels.

A terminal apparatus according to an aspect of the present disclosure is a terminal apparatus that performs radio communication of a time-division-duplex scheme with a base station, using any of a plurality of channels included in each of a plurality of frequency bands, the terminal apparatus including: a receiver that receives a downlink signal from the base station; a transmitter that transmits an uplink signal to the base station; and an extractor that extracts information on a plurality of use channels to be used for the radio communication from the received data, in which the receiver receives the downlink signal in a reception interval of the downlink signal, using at least one of the plurality of use channels, and the transmitter transmits the uplink signal in the reception interval of the downlink signal, using at least another one of the use channels that is not adjacent to the at least one of the plurality of use channels.

A radio communication system according to an aspect of the present disclosure is a system in which a terminal apparatus and a base station perform radio communication of a time-division-duplex scheme, using any of a plurality of channels included in each of a plurality of frequency bands, in which the base station includes: a channel selector that selects a plurality of use channels to be used for the radio communication; a first transmitter that transmits a downlink signal to the terminal apparatus; and a first receiver that receives an uplink signal from the terminal apparatus, and the terminal apparatus includes: a second receiver that receives the downlink signal; a second transmitter that transmits the uplink signal; and an extractor that extracts information on the plurality of use channels to be used for the radio communication from the received data, in which the first transmitter transmits, using at least one of the plurality of use channels, the downlink signal in a transmission interval of the downlink signal, and the second transmitter transmits the uplink signal in the transmission interval of the downlink signal, using at least another one of the plurality of use channels that is not adjacent to the at least one of the plurality of use channels.

A communication method according to an aspect of the present disclosure is a method in which a base station and a terminal apparatus perform radio communication of a time-division-duplex scheme, using any of a plurality of channels included in each of a plurality of frequency bands, the method including the following performed by the base station: selecting a plurality of use channels to be used for the radio communication; transmitting a downlink signal to the terminal apparatus; and receiving an uplink signal from the terminal apparatus, and the method including the following performed by the terminal apparatus: receiving the downlink signal; transmitting the uplink signal; and extracting information on the plurality of use channels to be used for the radio communication from the received downlink signal, in which the base station transmits, using at least one of the plurality of use channels, the downlink signal in a transmission interval of the downlink signal, and the terminal apparatus transmits the uplink signal in a reception interval of the downlink signal, using at least another one of the plurality of use channels that is not adjacent to the at least one of the plurality of use channels.

It should be noted that general or specific embodiments maybe implemented as a system, an apparatus, a method, an integrated circuit, a computer program, or a storage medium, and/or any selective combination of the system, the apparatus, the method, the integrated circuit, the computer program, and the storage medium.

Advantageous Effects of Invention

According to one aspect of the present disclosure, it is made possible to enhance transmission efficiency and also to suppress deterioration of transmission quality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, each embodiment of the present invention will be described in detail with reference to the accompanying drawings as appropriate. However, a more than necessary detailed description may be omitted. For example, a detailed description of an already well-known matter or an overlapping description for substantially identical components may be omitted. Such omission is to avoid rendering the following description unnecessarily redundant and to facilitate an understanding of a person skilled in the art.

Note that, the accompanying drawings and the following description are provided for a person skilled in the art to sufficiently understand the present disclosure and are not intended to limit the subject matter recited in the claims.

Figure 1:
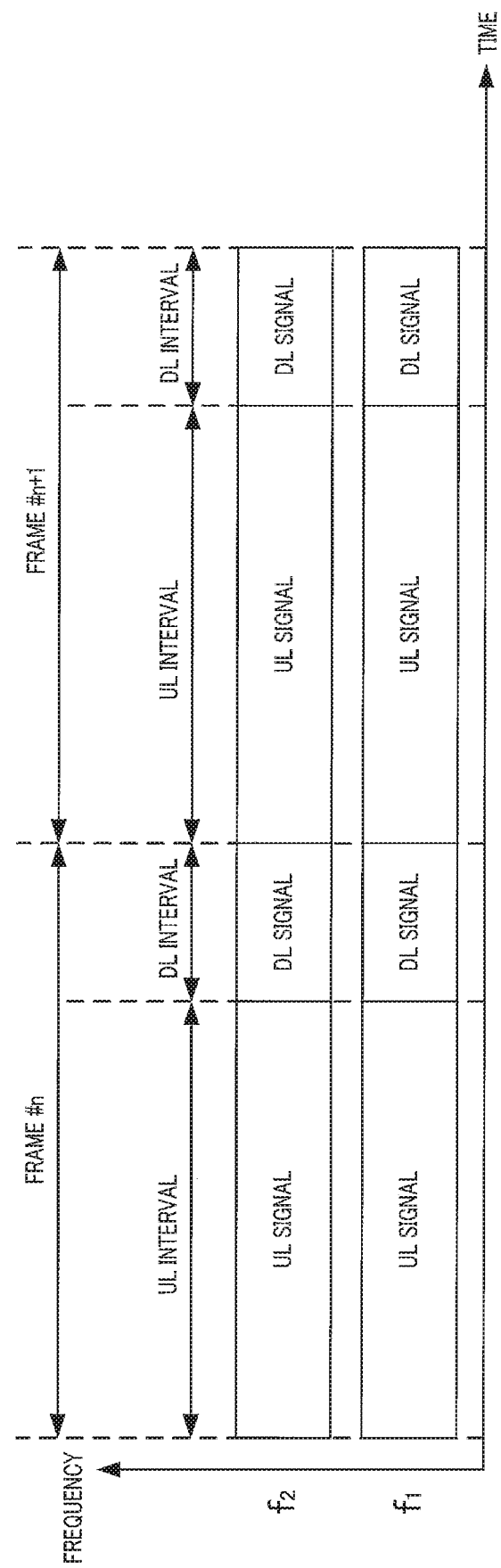
FIG. 1 is a diagram illustrating a first example of transmission and reception signals of an FPU simultaneously using a plurality of channels.
Figure 2:
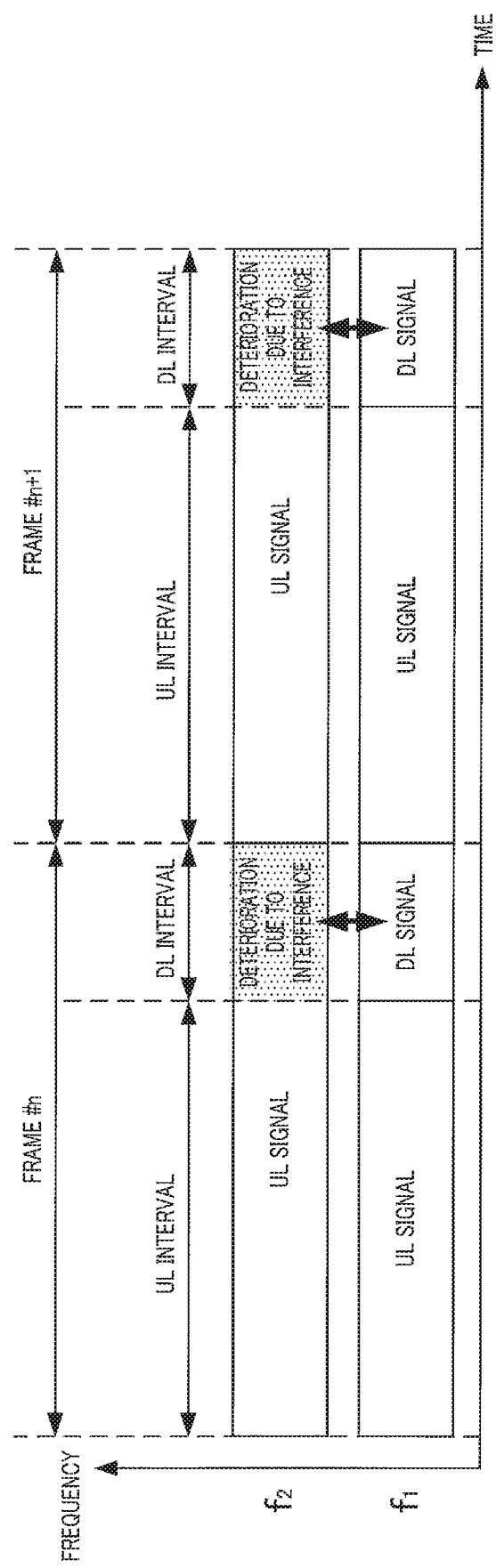
FIG. 2 is a diagram illustrating a second example of transmission and reception signals of an FPU simultaneously using a plurality of channels.

FIG. 1 is a diagram illustrating a first example of transmission and reception signals of an FPU simultaneously using a plurality of channels. FIG. 2 is a diagram illustrating a second example of transmission and reception signals of an FPU simultaneously using a plurality of channels. FIGS. 1 and 2 illustrate two consecutive frames (frame # n and frame # n+1), and an uplink (UL) interval and a downlink (DL) interval of each frame. In the UL interval and DL interval of each frame, signals to be transmitted and received using a channel of carrier frequency $f_1$ (hereafter, referred to as "channel $f_1$") and a channel of carrier frequency $f_2$ (hereafter, referred to as "channel $f_2$") are illustrated.

An uplink signal (UL signal) is a signal including video information and/or the like and is transmitted from a terminal apparatus to a base station. A downlink signal (DL signal) is a signal including feedback information, such as DL control information, and is transmitted to a terminal apparatus from a base station.

In FIG. 1, in the UL intervals, a terminal apparatus transmits UL signals using channel $f_1$ and channel $f_2$, and a base station receives the UL signals transmitted by the terminal apparatus. In the DL intervals, the base station transmits DL signals using channel $f_1$ and channel $f_2$, and the terminal apparatus receives the DL signals transmitted by the base station.

In an FPU, since UL signals are the signals that include video information and/or the like and DL signals are the signals that include feedback information, as in the example of FIG. 1, an increase in the intervals where the DL signals are transmitted and received causes a decrease in the transmission efficiency of the UL signals that include video information and/or the like.

In FIG. 2, in the UL intervals, a terminal apparatus transmits UL signals using channel $f_1$ and channel $f_2$, and a base station receives the UL signals transmitted by the terminal apparatus. In the DL intervals, the base station transmits the DL signals using channel $f_1$ and the terminal apparatus transmits the UL signals using channel $f_2$. The base station receives the UL signals transmitted using channel $f_2$ by the terminal apparatus, and the terminal apparatus receives the DL signals transmitted using channel $f_1$ by the base station.

In the example of FIG. 2, since the DL signals are transmitted and received using channel $f_1$ and the UL signals are transmitted and received using channel $f_2$ in the DL intervals, the intervals in which the DL signals are transmitted and received are small as compared with FIG. 1. Therefore, the decrease in the transmission efficiency of UL signals is suppressed. However, since the base station receives the UL signals, using channel $f_2$, while transmitting the DL signals, using channel $f_1$, the transmission quality (e.g., receiving quality of UL signals) deteriorates due to interference between channel $f_1$ and channel $f_2$ that is adjacent to channel $f_1$.

The present disclosure has been made in view of the abovementioned points and provides a base station, a terminal apparatus, a radio communication system, and a communication method each capable of enhancing transmission efficiency and suppressing deterioration of transmission quality.

Embodiments

Figure 3:
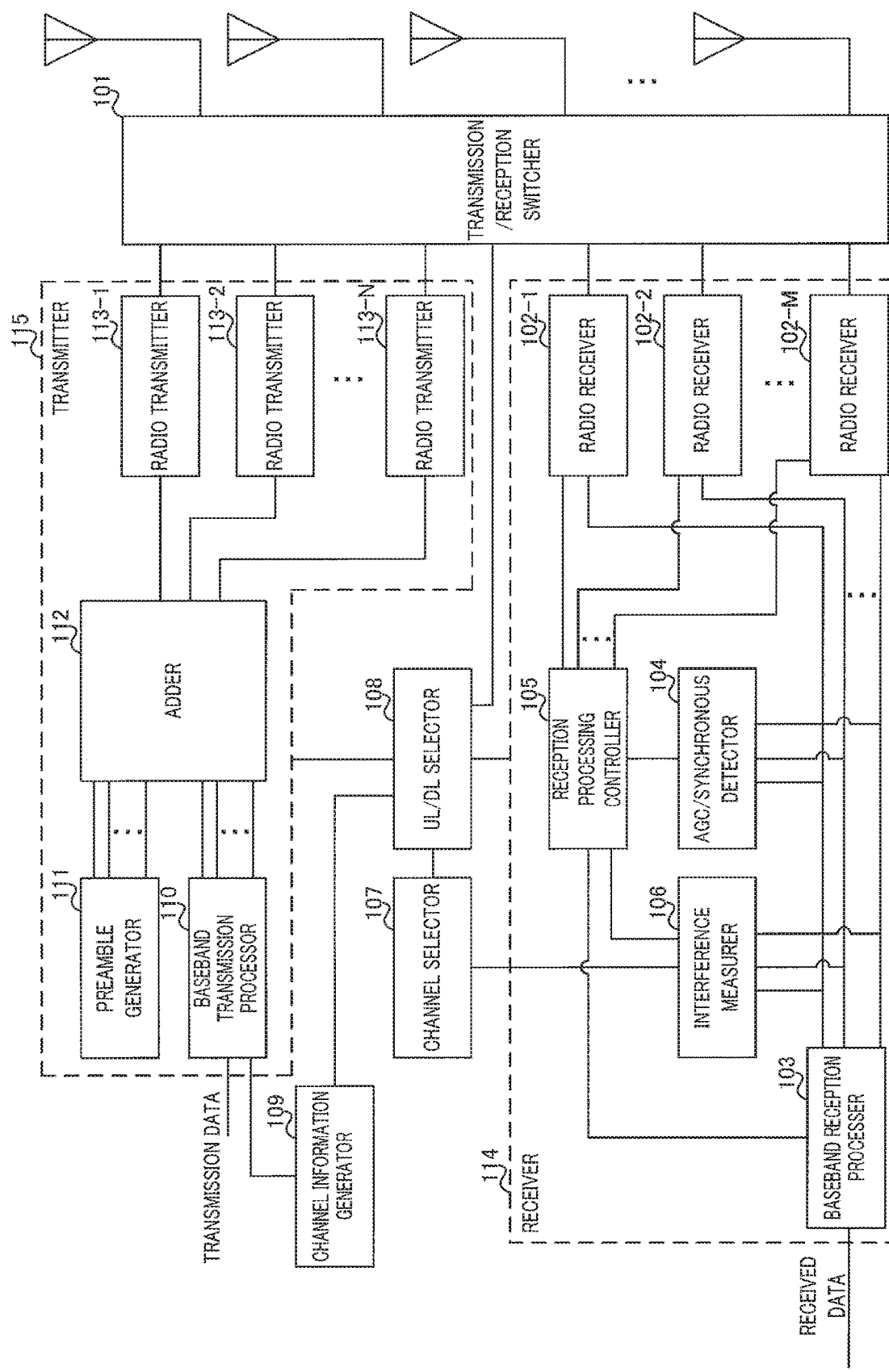
FIG. 3 is a block diagram illustrating a configuration example of a base station according to an embodiment of the present disclosure.
Figure 4:
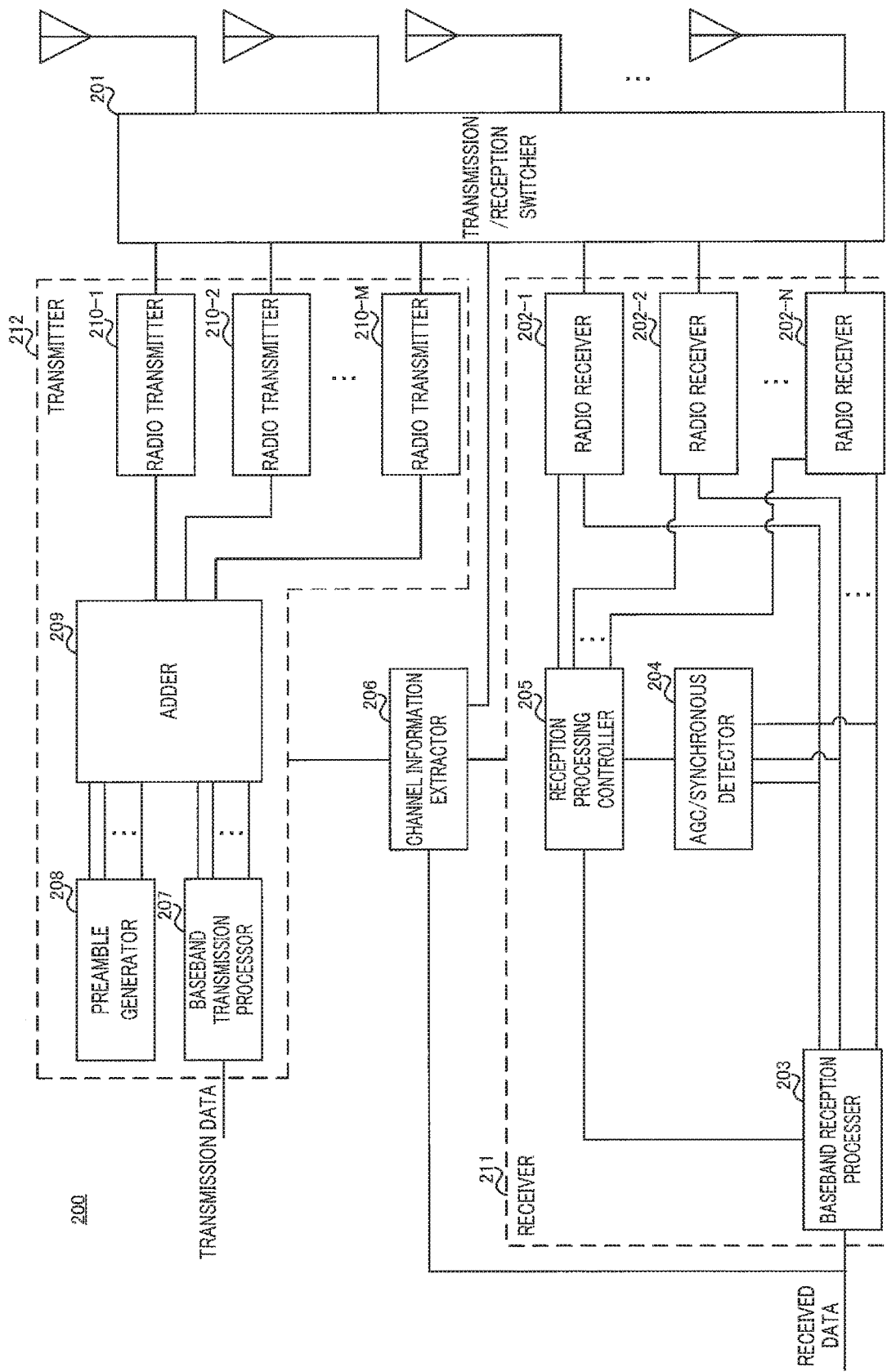
FIG. 4 is a block diagram illustrating a configuration example of a terminal apparatus according to the embodiment of the present disclosure.

A radio communication system according to an embodiment includes base station 100 illustrated in FIG. 3 and terminal apparatus 200 illustrated in FIG. 4. Base station 100 and terminal apparatus 200 are each an FPU used for material transmission in the broadcasting field, for example. That is, terminal apparatus 200 transmits video information and/or the like to base station 100 as a UL signal, and base station 100 transmits DL control information and/or the like for feedback to terminal apparatus 200 as a DL signal.

In the radio communication system according to this embodiment, a UL signal and a DL signal are transmitted and received using a time division duplex (TDD) scheme. Moreover, a non-transmission interval of a signal called a "guard time" is provided between UL and DL signals. In the radio communication system according to this embodiment, a plurality of frequency bands are available and each frequency band includes a plurality of channels. In the radio communication system according to this embodiment, a UL signal and a DL signal are transmitted and received using at least one of the plurality of channels included in each of the plurality of frequency bands.

<Configuration of Base Station>

A configuration example of base station 100 according to this embodiment will be described using FIG. 3. FIG. 3 is a block diagram illustrating the configuration example of base station 100 according to this embodiment.

As illustrated in FIG. 3, base station 100 includes transmission/reception switcher 101, radio receivers 102-1 to 102-M ("M" is an integer equal to or greater than two), baseband reception processor 103, AGC/synchronous detector 104, reception processing controller 105, interference measurer 106, channel selector 107, UL/DL selector 108, channel information generator 109, baseband transmission processor 110, preamble generator 111, adder 112, and radio transmitters 113-1 to 113-N ("N" is an integer equal to or greater than two).

Receiver 114 comprising radio receivers 102-1 to 102-M, baseband reception processor 103, AGC/synchronous detector 104, reception processing controller 105, and interference measurer 106 receives a UL signal from terminal apparatus 200. Transmitter 115 comprising baseband transmission processor 110, preamble generator 111, adder 112, and radio transmitters 113-1 to 113-N transmits a DL signal to terminal apparatus 200. Note that, M represents the number of channels through which receiver 114 can receive a UL signal, for example, and N represents the number of channels through which transmitter 115 can transmit a DL signal, for example. M and N may be the same and may be different from each other.

Transmission/reception switcher 101 acquires configuration information from UL/DL selector 108 to be described, hereinafter, and performs switching between transmission and reception of a signal in UL and DL intervals. For example, in a UL interval, transmission/reception switcher 101 performs switching such that a UL signal is received in the UL interval via an antenna using each channel indicated by the configuration information. Furthermore, in a DL interval, transmission/reception switcher 101 performs switching between transmission and reception of a signal such that reception of a UL signal or transmission of a DL signal is performed in the DL interval, using each channel indicated by the configuration information. Note that, the channel indicated by the configuration information is a channel which is selected by channel selector 107 to be described, hereinafter, and is used for communication.

Radio receivers 102-1 to 102-M apply radio reception processing, such as amplification and/or filtering, based on information on automatic gain control (AGC) of an immediately before frame to be acquired from reception processing controller 105 to be described hereinafter, to radio signals (UL signals) acquired via transmission/reception switcher 101. Radio receivers 102-1 to 102-M apply down-conversion to the signals resulting from the radio reception processing based on carrier frequencies of the channels indicated by the configuration information and acquires baseband signals of the channels. Radio receivers 102-1 to 102-M output the baseband signals of the channels.

Baseband reception processor 103 performs baseband reception processing, such as fast Fourier transform (FFT) processing, demodulation processing, and/or error correction processing, to the baseband signals acquired from radio receivers 102-1 to 102-M, based on timing information acquired from reception processing controller 105 to be described, hereinafter. Baseband reception processor 103 outputs the received data for which the baseband reception processing has been performed.

AGC/synchronous detector 104 detects timing information for synchronization between transmission and reception, and information for the gain control (AGC) in the reception processing and/or the like (e.g., signal level), based on preambles included in the baseband signals acquired from radio receivers 102-1 to 102-M. AGC/synchronous detector 104 outputs the detection result of information for timing and AGC to reception processing controller 105.

Reception processing controller 105 controls the timing of reception processing, and AGC based on the detection result acquired from AGC/synchronous detector 104. More specifically, reception processing controller 105 outputs the timing information indicating the processing timing, such as a start point and/or an end point of the baseband reception processing, to baseband reception processor 103. Reception processing controller 105 outputs the timing information indicating the processing timing, such as a start point and/or an end point of interference measurement, to interference measurer 106. Reception processing controller 105 outputs the information on AGC to radio receivers 102-1 to 102-M.

At this time, when acquiring a detection result from AGC/synchronous detector 104, reception processing controller 105 generates the timing information and the information on AGC based on the acquired detection result.

Interference measurer 106 measures, while assuming the guard time interval to be an interference measurement interval, a receiving level (the amount of interference, e.g., receiving intensity, (RSSI: Received Signal Strength Indicator)) of each channel included in each available frequency band in the interference measurement interval. For example, interference measurer 106 outputs a measurement result to channel selector 107.

Channel selector 107 selects a channel to be used for communication, based on the receiving level of each channel included in each frequency band, which is measured by interference measurer 106. For example, channel selector 107 selects a channel having a receiving level less than a predetermined value to be the channel to be used for communication.

UL/DL selector 108 selects whether each channel selected by channel selector 107 is used for reception of a UL signal (UL reception) in a DL interval or used for transmission of a DL signal (DL transmission) in the DL interval.

For example, UL/DL selector 108 selects a channel of a relatively low carrier frequency for use of DL transmission from among the channels selected by channel selector 107.

UL/DL selector 108 selects, for use of UL reception, a channel not adjacent to the channel that has been selected for use of DL transmission. For example, when the channel selected by channel selector 107 is included in a different frequency band, UL/DL selector 108 selects, for use of UL reception, a channel included in a frequency band different from a frequency band including the channel that has been selected for use of DL transmission. That is, the channel not adjacent to the channel that has been selected for use of DL transmission may be a channel included in a frequency band different from the frequency band including the channel selected for use of DL transmission, for example.

Note that, a description of a specific example of selecting UL reception or DL transmission in a DL interval will be given in detail, hereinafter.

UL/DL selector 108 outputs, to transmission/reception switcher 101, channel information generator 109, receiver 114 and transmitter 115, information (configuration information) associating the channel selected by channel selector 107 with whether to use the selected channel for UL reception or DL transmission in the DL interval.

Channel information generator 109 generates the information (channel information) to be indicated to terminal apparatus 200, based on the configuration information acquired from UL/DL selector 108. Channel information generator 109 outputs the channel information to baseband transmission processor 110. Note that, a specific example of the channel information to be generated in channel information generator 109 will be described, hereinafter.

Baseband transmission processor 110 applies error correction coding and modulation to transmission data (DL data) and channel information and then applies inverse fast Fourier transform (IFFT) processing to acquire baseband signals for the number of channels indicated by the configuration information. Baseband transmission processor 110 outputs the baseband signals to adder 112.

Preamble generator 111 generates preambles for the number of channels indicated by the configuration information and outputs the preambles to adder 112. Preamble data is symbol data previously known to base station 100 and terminal apparatus 200.

Adder 112 adds the preambles acquired from preamble generator 111 to preceding parts of the baseband signals of transmission data based on a predetermined frame configuration. Adder 112 outputs the baseband transmission signals in which the preambles have been added to the preceding parts of the baseband signals of the transmission data to radio transmitters 113-1 to 113-N.

Radio transmitters 113-1 to 113-N apply radio transmission processing, such as amplification and/or filtering, to the baseband transmission signals in which the preambles have been added. Radio transmitters 113-1 to 113-N apply up-conversion to the signals resulting from the radio transmission processing based on carrier frequencies of the channels indicated by the configuration information to acquire radio signals. Radio transmitters 113-1 to 113-N transmit radio signals (DL signals) from antennas via transmission/reception switcher 101.

<Configuration of Terminal Apparatus>

Next, a configuration example of terminal apparatus 200 according to this embodiment will be described using FIG. 4. FIG. 4 is a block diagram illustrating the configuration example of terminal apparatus 200 according to this embodiment.

As illustrated in FIG. 4, terminal apparatus 200 includes transmission/reception switcher 201, radio receivers 202-1 to 202-N, baseband reception processor 203, AGC/synchronous detector 204, reception processing controller 205, channel information extractor 206, baseband transmission processor 207, preamble generator 208, adder 209, and radio transmitters 210-1 to 210-M.

Receiver 211 comprising radio receivers 202-1 to 202-N, baseband reception processor 203, AGC/synchronous detector 204, and reception processing controller 205 receives a DL signal from base station 100. Transmitter 212 comprising baseband transmission processor 207, preamble generator 208, adder 209, and radio transmitters 210-1 to 210-M transmits a UL signal to base station 100.

Transmission/reception switcher 201 acquires channel information from channel information extractor 206 to be described, hereinafter, and performs switching between transmission and reception of a signal in UL and DL intervals. For example, in a UL interval, transmission/reception switcher 201 performs switching such that a UL signal is transmitted via an antenna using each channel indicated by channel information. Transmission/reception switcher 201 performs switching between transmission and reception of a signal such that transmission of a UL signal or reception of a DL signal is performed using each channel indicated by the channel information in a DL interval. Note that, the channel indicated by channel information is a channel selected by channel selector 107 and used for communication.

Radio receivers 202-1 to 202-N apply radio reception processing, such as amplification and/or filtering, to radio signals (DL signals) received via antennas, based on the information on AGC in an immediately before frame that is acquired from reception processing controller 205 to be described, hereinafter. Radio receivers 202-1 to 202-N apply down-conversion to the signals resulting from the radio reception processing based on the carrier frequencies of the channels indicated by the channel information to acquire baseband signals of the respective channels. Radio receivers 202-1 to 202-N output the baseband signals of the respective channels.

Baseband reception processor 203 applies baseband reception processing, such as fast Fourier transform (FFT) processing, demodulation processing, and/or error correction processing, to the baseband signals acquired from radio receivers 202-1 to 202-N, based on timing information to be acquired from reception processing controller 205 to be described, hereinafter. Baseband reception processor 203 outputs the received data to which the baseband reception processing has been applied. Note that, the received data includes the result of the baseband reception processing of the channel information transmitted from base station 100.

AGC/synchronous detector 204 detects timing information for synchronization between transmission and reception, and information for the gain control (AGC) in the reception processing and/or the like (e.g., signal level) based on the preambles included in the baseband signals acquired from radio receivers 202-1 to 202-N. AGC/synchronous detector 204 outputs the detection result of the information for timing and AGC to reception processing controller 205.

Reception processing controller 205 controls the timing of reception processing, and AGC based on the detection result acquired from AGC/synchronous detector 204. More specifically, reception processing controller 205 outputs the timing information indicating the processing timing, such as a start point and/or an end point of the baseband reception processing, to baseband reception processor 203. Reception processing controller 205 outputs the information on AGC to radio receivers 202-1 to 202-N.

Channel information extractor 206 acquires received data from baseband reception processor 203 and extracts the channel information. Channel information extractor 206 outputs the extracted channel information to transmission/reception switcher 201, receiver 211, and transmitter 212.

Baseband transmission processor 207 applies error correction coding and modulation to the transmission data (UL data) and applies inverse fast Fourier transform (IFFT) processing to acquire the baseband signals of the transmission data for the number of channels indicated by the channel information. Baseband transmission processor 207 outputs the baseband signals of transmission data to adder 209.

Preamble generator 208 generates preambles for the number of channels indicated by the channel information and outputs the preambles to adder 209.

Adder 209 adds the preambles acquired from preamble generator 208 to preceding parts of the baseband signals of transmission data based on a predetermined frame configuration. Adder 209 outputs the baseband transmission signals in which the preambles have been added to the preceding parts of the baseband signals of the transmission data to radio transmitters 210-1 to 210-M.

Radio transmitters 210-1 to 210-M apply radio transmission processing, such as amplification and/or filtering, to the baseband transmission signals in which the preambles have been added. Radio transmitter 109 applies up-conversion to the signals resulting from the radio transmission processing based on the carrier frequencies of the channels indicated by the channel information to acquire radio signals (UL signals). Radio transmitters 210-1 to 210-M transmit the UL signals from antennas via transmission/reception switcher 201.

<Specific Example of Selection of UL Reception or DL Transmission in DL. Interval>

Hereinafter, a description will be given of an example in which two frequency bands are available in a radio communication system including base station 100 and terminal apparatus 200 and each of the frequency bands includes two channels as an example. In this example, channel selector 107 of base station 100 selects two channels.

In this case, when base station 100 uses two frequency bands, i.e., two channels selected by channel selector 107 are included in two different frequency bands, UL/DL selector 108 selects transmission of a DL signal, using one channel included in a relatively low frequency band and reception of a UL signal, using one channel included in a relatively high frequency band in a DL interval. In a case where base station 100 uses one frequency band, i.e., in a case where a plurality of channels selected by channel selector 107 are included in the same frequency band, UL/DL selector 108 selects transmission of a DL signal, using two channels in the DL interval.

Figure 5:
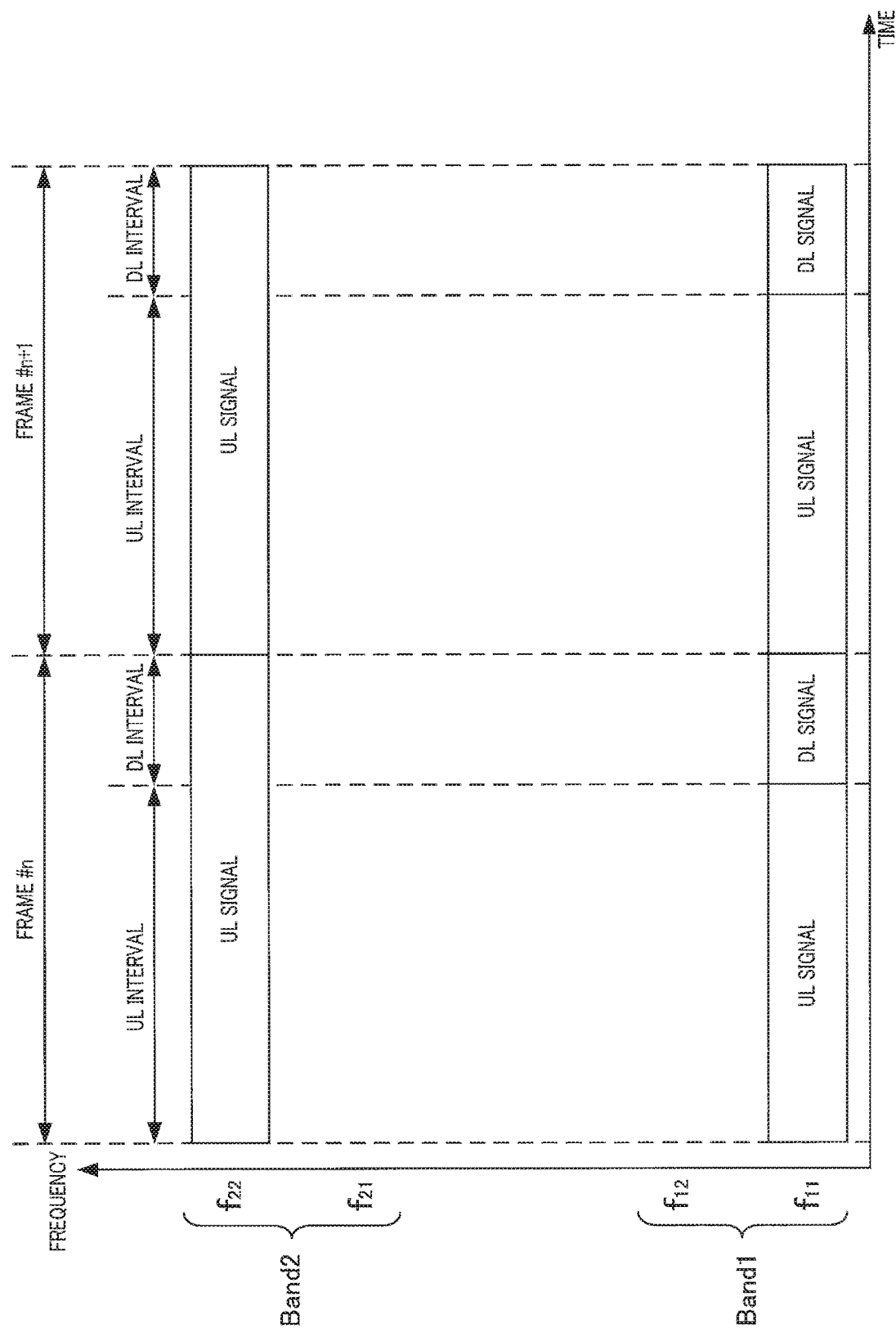
FIG. 5 is a diagram illustrating an example of transmission and reception signals according to the embodiment of the present disclosure.
Figure 6:
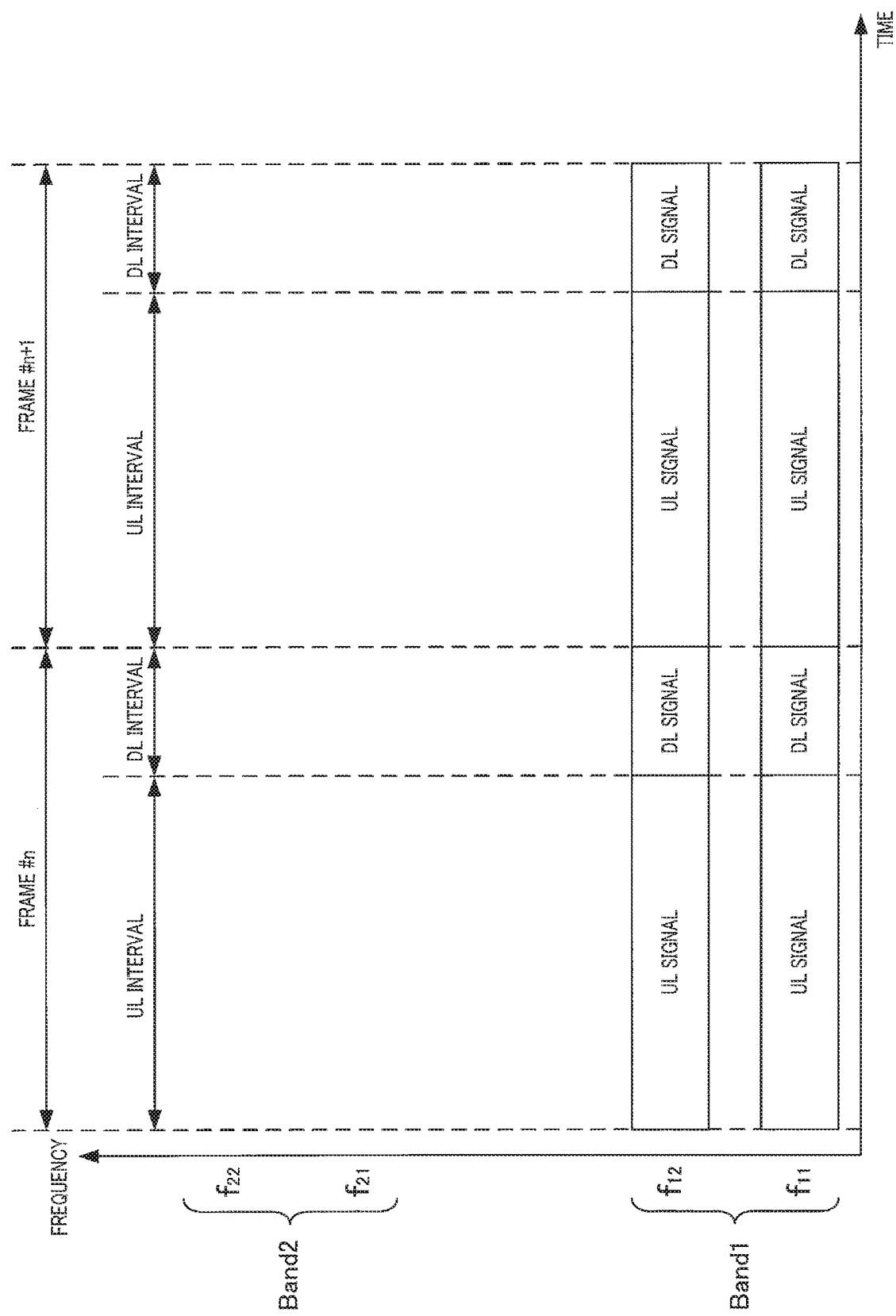
FIG. 6 is a diagram illustrating an example of transmission and reception signals according to the embodiment of the present disclosure.

FIGS. 5 and 6 are diagrams illustrating an example of transmission and reception signals according to this embodiment.

The horizontal axes of FIGS. 5 and 6 indicate time and vertical axes indicate frequency. Two frequency bands including Band 1 including channel $f_{11}$ and channel $f_{12}$, and Band 2 including channel $f_{21}$ and channel $f_{22}$ are illustrated in FIGS. 5 and 6. Two frames including the n-th frame ("n" is an integer equal to or greater than one) (frame # n) and the n+1-th frame (frame # n+1) are illustrated in FIGS. 5 and 6. As described above, since communication using the time division duplex scheme is performed in the radio communication system in this embodiment, a UL interval and a DL interval are provided by time sharing. Note that, although a guard time (GT) may be provided between the UL interval and the DL interval (e.g., between UL and DL signals), illustration of the GT is omitted for simplicity of illustration.

In the radio communication system according to this embodiment, a 1.2-GHz band is used as Band 1 and a 2.3-GHz band is used as Band 2, for example.

FIG. 5 illustrates an example of transmission and reception signals of a case where base station 100 selects channel $f_{11}$ and channel $f_{22}$. As illustrated in FIG. 5, in a case where channel $f_{11}$ and channel $f_{22}$ selected by base station 100 are included respectively in Band 1 and Band 2 which are different frequency bands, base station 100 transmits a DL signal, using channel $f_{11}$, and a terminal apparatus 200 transmits a UL signal, using channel $f_{22}$ in the DL interval. Base station 100 receives the UL signal transmitted using channel $f_{22}$ by terminal apparatus 200, and terminal apparatus 200 receives the DL signal transmitted using channel $f_{11}$ by base station 100.

FIG. 6 illustrates an example of transmission and reception signals of a case where base station 100 selects channel $f_{11}$ and channel $f_{12}$. As illustrated in FIG. 6, when channel $f_{11}$ and channel $f_{12}$ are selected by base station 100 are in Band 1, which is the same frequency band, base station 100 transmits a DL signal, using channel $f_{11}$ and channel $f_{12}$, and terminal apparatus 200 receives the DL signal transmitted using channel $f_{11}$ and channel $f_{12}$ by base station 100.

As illustrated in FIG. 5, in a case where the radio communication system according to this embodiment uses a plurality of different frequency bands, i.e., in a case where a plurality of channels selected by base station 100 are included in different frequency bands, base station 100 transmits a DL signal, using one channel in a DL interval. Meanwhile, as illustrated in FIG. 6, in a case where the radio communication system according to this embodiment uses one frequency band, i.e., in a case where a plurality of channels selected by base station 100 are included in the same frequency band, base station 100 transmits DL signals, using all the plurality of selected channels.

<Specific Example of Channel Information>

Figure 7:
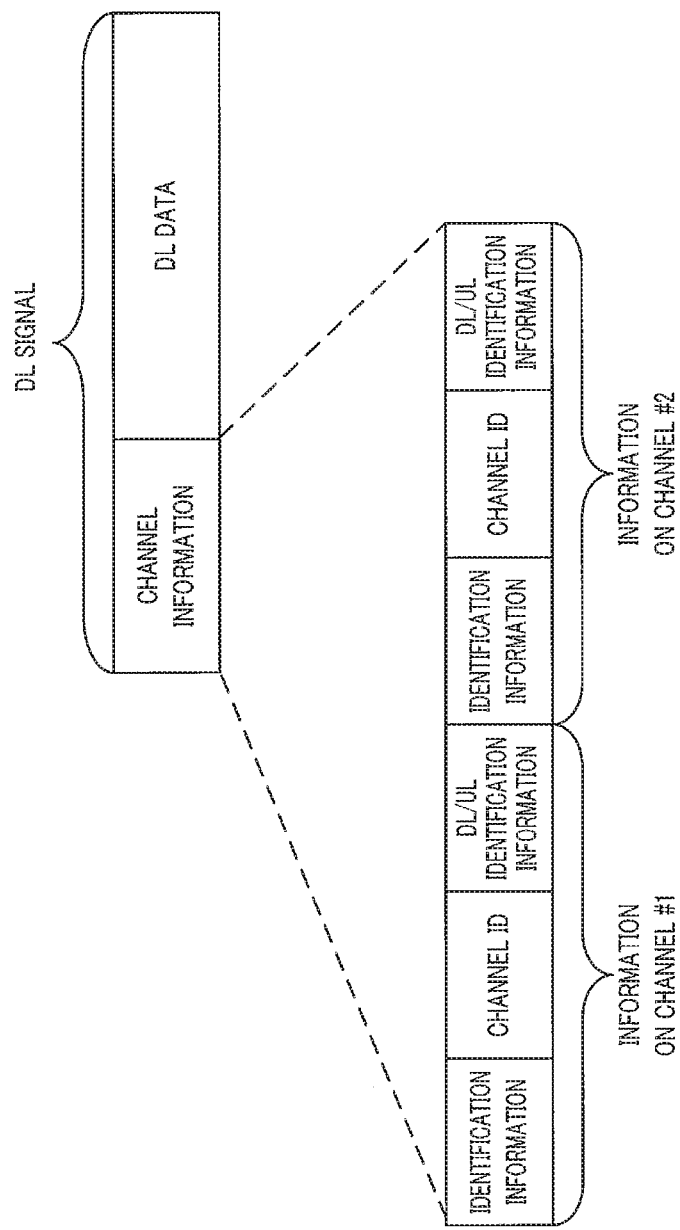
FIG. 7 is a diagram illustrating a first example of a format of channel information included in a DL signal.

FIG. 7 is a diagram illustrating a first example of a format of channel information included in a DL signal. The channel information in FIG. 7 is information of a case where base station 100 selects two channels, for example, as illustrated in FIG. 5.

Channel information includes the information on channel #1 and the information on channel #2. The information on channel #1 and the information on channel #2 each include identification information, a channel ID, and DL/UL identification information. In a case where base station 100 selects three or more channels, the information on channel #3 or more channel is included.

Channel ID is an identifier of the channel selected by base station 100. Base station 100 and terminal apparatus 200 have a correspondence relationship list between a plurality of available channels included in each of a plurality of frequencies (four channels in the example of FIGS. 5 and 6), and channel IDs of the respective channels. Terminal apparatus 200 then identifies the channel to be used in the next frame by the channel ID.

Identification information is information indicating the presence or absence of change of a channel. For example, in a case where channel #1 is not changed from the channel used in the current frame, i.e., in a case where channel #1 is used in the current frame and channel #1 is used in the next frame, the identification information included in the information on channel #1 is set to "0." Meanwhile, in a case where channel #1 is changed from the channel used in the current frame, i.e., in a case where channel #1 is not used in the current frame, but channel #1 is used from the next frame, the identification information included in the information on channel #1 is set to "1."

DL/UL identification information is 1-bit information for identifying whether transmission and reception of a DL signal are performed or transmission and reception of a UL signal are performed using each channel in a DL interval. For example, in a case where transmission and reception of a DL signal are performed using channel #1 in the DL interval, the DL/UL identification information included in the information on channel #1 is set to "0." Meanwhile, when transmission and reception of a UL signal are performed using channel #1 in a DL interval, the DL/UL identification information included in the information on channel #1 is set to "1."

For example, in FIG. 5, channel #1 and channel #2 correspond to channel $f_{11}$ and channel $f_{22}$, respectively. Suppose that channel $f_{22}$ is not changed but channel $f_{11}$ is changed from channel $f_{12}$ between frame # n−1 (not illustrated) and frame # n. In this case, the channel ID of channel #1 and the channel ID of channel #2, which are included in a DL signal transmitted from base station 100 in the DL interval of frame # n−1 become the ID of channel $f_{11}$, and the ID of channel $f_{22}$, respectively. The identification information on channel #1 is set to "1," and the identification information on channel #2 is set to "0." Since transmission and reception of a DL signal are performed in the DL interval of frame # n, using channel $f_{11}$, the DL/UL identification information on channel #1 is set to "0." Furthermore, since the transmission and reception of a UL signal are performed using channel $f_{22}$ in the DL interval of frame # n, the DL/UL identification information on channel #2 is set to "1."

The channel to be used and the channel for transmission and reception of a DL signal are not changed between frame # n and frame # n+1 in FIG. 5. In this case, the DL signal transmitted from base station 100 in the DL interval of frame # n need not include channel information.

Figure 8:
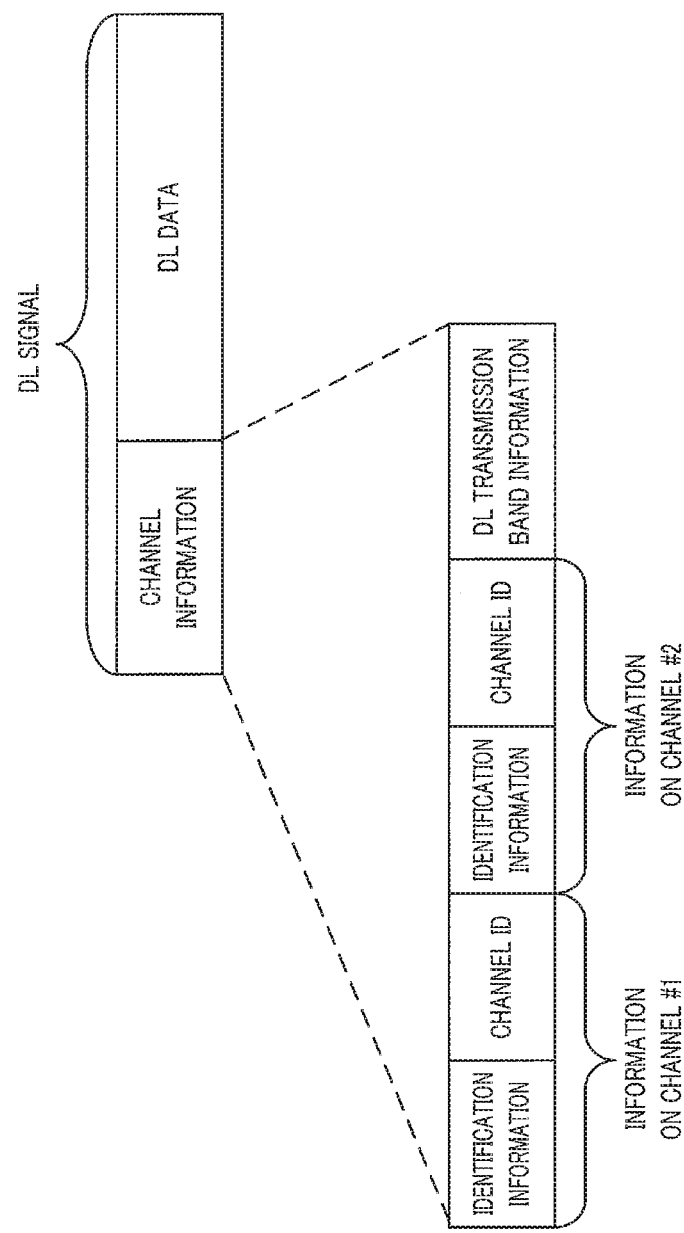
FIG. 8 is a diagram illustrating a second example of a format of channel information included in a DL signal.

FIG. 8 is a diagram illustrating a second example of a format of the channel information included in a DL signal. Note that, the channel information in FIG. 8 is information of a case where base station 100 selects two channels as in FIG. 7.

Channel information includes the information on channel #1, the information on channel #2, and DL transmission band information. Each of the information on channel #1 and the information on channel #2 includes identification information and a channel ID. When base station 100 selects three or more channels, the information on and after channel #3 is included. Note that, since the identification information and the channel ID are the same as those in FIG. 7, a detailed description is omitted.

Although DL/UL identification information is included in information on each of a plurality of channels (channel #1 and channel #2) in the channel information in FIG. 7, as for the channel information in FIG. 8, DL transmission band information is included instead of DL/UL identification information.

DL transmission band information is information indicating the frequency band in which base station 100 transmits a DL signal. For example, as illustrated in FIGS. 5 and 6, when two frequency bands, Band 1 and Band 2, are available, the DL transmission band information is represented by one bit. When base station 100 transmits a DL signal, using a channel included in Band 1, the DL transmission band information is set to "0," and when base station 100 transmits a DL signal, using a channel included in Band 2, the DL transmission band information is set to "1." When three or more frequency bands are available, the DL transmission band information may be two or more bits.

For example, in FIG. 5, in order for base station 100 to transmit a DL signal, using channel $f_{11}$ included in Band 1, the DL transmission band information is set to "0." In FIG. 6, in order for base station 100 to transmit a DL signal, using channel $f_{11}$ and channel $f_{12}$, which are included in Band 1, the DL transmission band information is set to "0."

The channel information in FIG. 8 employs a configuration including DL transmission band information instead of the DL/UL identification information included in the channel information in FIG. 7. DL/UL identification information is 1-bit information configured for each channel to be used, whereas DL transmission band information is information for identifying a frequency band in which a DL signal is transmitted among available frequency bands. Therefore, for example, the larger the number of channels to be used, the larger the size (number of bits) of the channel information in FIG. 7 is. Base station 100 may select a format of the channel information in FIGS. 7 and 8 in accordance with the number of available frequency bands and the number of channels to be used.

Note that, base station 100 transmits the channel information illustrated in FIG. 7 or 8 to terminal apparatus 200 when changing the channel used in the next frame and/or when changing the channel for transmitting a DL signal. Furthermore, base station 100 transmits the channel information illustrated in FIG. 7 or 8 to terminal apparatus 200 before start of communication with terminal apparatus 200.

For example, base station 100 transmits channel information, using a channel configured by default, before start of communication with terminal apparatus 200.

Base station 100 need not transmit channel information to terminal apparatus 200 when not changing the channel to be used or when not changing the channel for base station 100 to transmit a DL signal.

<Process Flow of Base Station 100>

Figure 9:
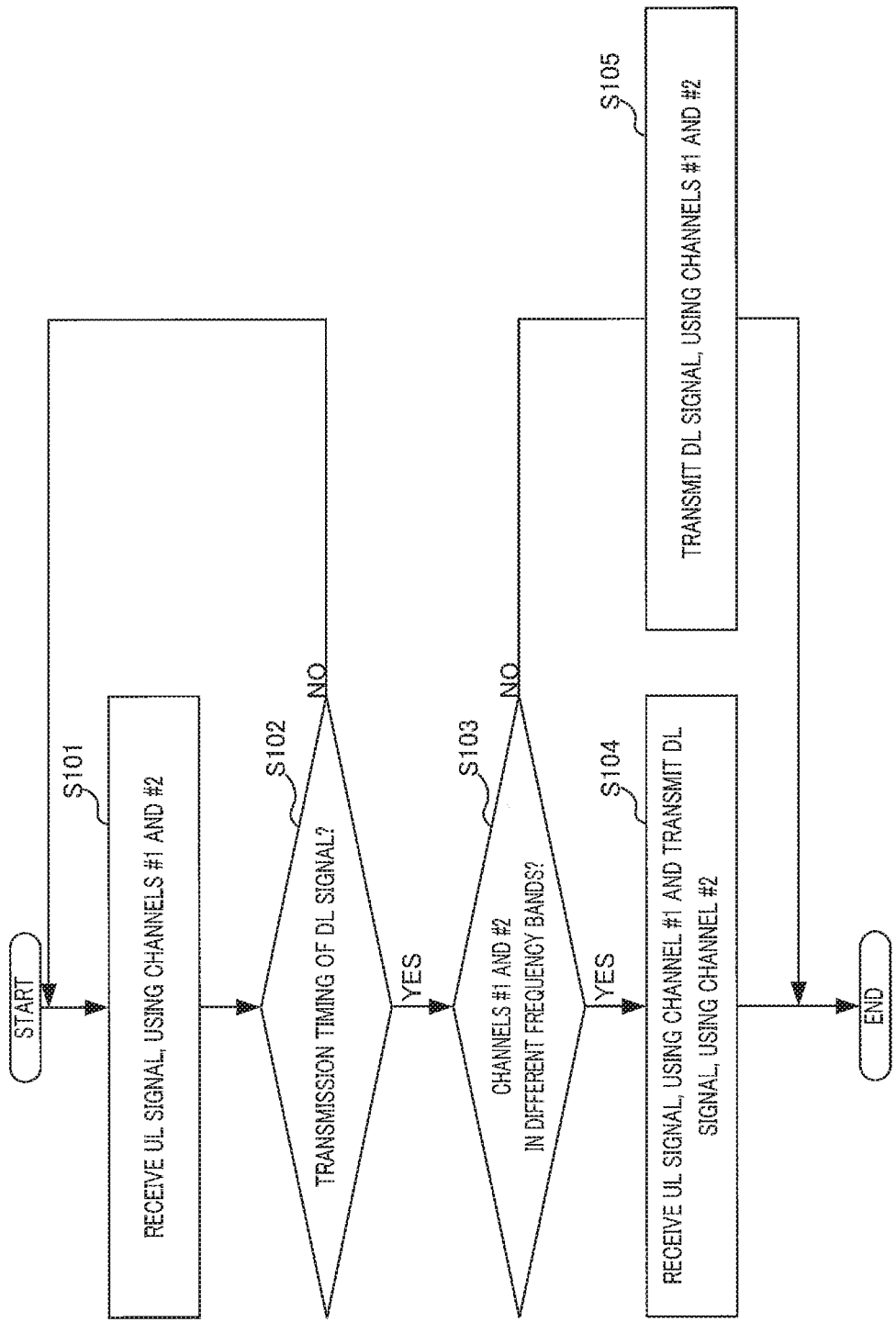
FIG. 9 is a flowchart illustrating a processing flow of the base station in the embodiment of the present disclosure.

Next, a description will be given of a process flow of base station 100 in this embodiment. FIG. 9 is a flowchart illustrating the process flow of base station 100 in this embodiment. The process flow of transmission and reception of a signal using channel #1 and channel #2 in a UL interval and a DL interval of the n-th frame is illustrated in FIG. 9.

Base station 100 receives, using channel #1 and channel #2 in a UL interval, a UL signal transmitted from terminal apparatus 200 (S101).

Base station 100 determines whether or not transmission timing of a DL signal has come, i.e., whether or not start timing of a DL interval has come (S102).

In a case where the transmission timing of a DL signal has not come (NO in S102), i.e., in a case where it is a UL interval, the flow returns to the processing of S101, and base station 100 receives a UL signal until the transmission timing of DL signal comes.

In a case where the transmission timing of a DL signal has come (YES in S102), base station 100 determines whether channel #1 and channel #2 which are currently in use are included in different frequency bands (S103).

In a case where channel #1 and channel #2 are included in different frequency bands (YES in S103), base station 100 receives, using channel #1, a UL signal transmitted from terminal apparatus 200, and transmits a DL signal to terminal apparatus 200, using channel #2 (S104). Reception of a UL signal and transmission of a DL signal are performed until the end of the DL interval in the n-th frame, and the flow ends.

In a case where channel #1 and channel #2 are not included in different frequency bands, (NO in S103), i.e., in a case where channel #1 and channel #2 are included in the same frequency band, base station 100 transmits a DL signal to terminal apparatus 200, using channel #1 and channel #2 (S105). Transmission of a DL signal is performed until the end of the DL interval in the n-th frame, and the flow ends.

Note that, although the description has been given with a case where base station 100 determines whether channel #1 and channel #2 which are currently in use are included in different frequency bands in S103 in FIG. 9, base station 100 may perform processing in S103 and processing subsequent to S103 (i.e., processing of S104 and S105) based on configuration information.

<Process Flow of Terminal Apparatus 200>

Figure 10:
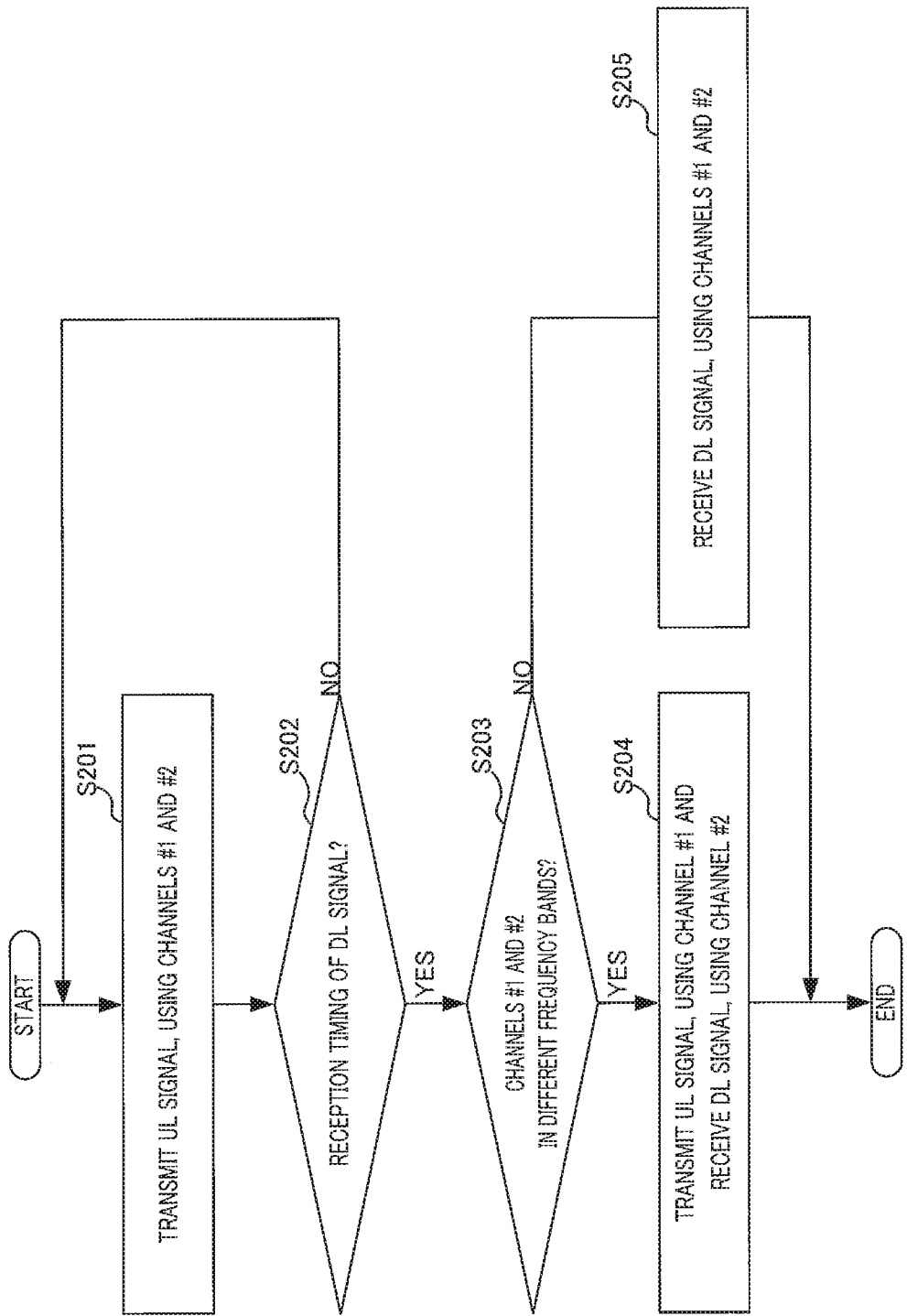
FIG. 10 is a flowchart illustrating a processing flow of the terminal apparatus in the embodiment of the present disclosure.

Next, a description will be given of a process flow of terminal apparatus 200 in this embodiment. FIG. 10 is a flowchart illustrating the process flow of terminal apparatus 200 in this embodiment. The process flow of transmission and reception of a signal using channel #1 and channel #2 in the UL interval and the DL interval of the n-th frame is illustrated in FIG. 10.

Terminal apparatus 200 transmits, using channel #1 and channel #2 in the UL interval, a UL signal to base station 100 (S201).

Terminal apparatus 200 determines whether or not reception timing of a DL signal has come, i.e., whether or not the start timing of a DL interval has come (S202).

In a case where the reception timing of a DL signal has not come (NO in S202), i.e., in a case where it is a UL interval, the flow returns to the processing of S201, and terminal apparatus 200 transmits a UL signal until the reception timing of a DL signal comes.

In a case where the reception timing of a DL signal has come (YES in S202), terminal apparatus 200 determines whether channel #1 and channel #2 which are currently in use are included in different frequency bands (S203).

In a case where channel #1 and channel #2 are included in different frequency bands (YES in S203), terminal apparatus 200 transmits, using channel #1, a UL signal to base station 100, and receives, using channel #2, a DL signal transmitted from base station 200 (S204). Transmission of a UL signal and reception of a DL signal are performed until the end of the DL interval in the n-th frame, and the flow ends.

In a case where channel #1 and channel #2 are not included in different frequency bands, (NO in S203), i.e., in a case where channel #1 and channel #2 are included in the same frequency band, terminal apparatus 200 receives, using channel #1 and channel #2, a DL signal transmitted from base station 100 (S205). Reception of a DL signal is performed until the end of the DL interval in the n-th frame, and the flow ends.

Note that, although the description has been given with a case where terminal apparatus 200 determines whether channel #1 and channel #2 which are currently in use are included in different frequency bands in S203 in FIG. 10, terminal apparatus 200 may perform processing in S203 and processing subsequent to S203 (i.e., processing of S204 and S205) based on channel information included in a DL signal to be received from base station 100.

As has been described thus far, in this embodiment, base station 100 selects a plurality of channels to be used for communication with terminal apparatus 200. In a case where the selected plurality of channels are included in different frequency bands, base station 100 transmits a DL signal using a channel included in one frequency band and receives a UL signal, using a channel included in a frequency band that is different from the one frequency band in the DL interval. With this configuration, in a case where the selected plurality of channels do not interfere with each other because they are included in different frequency bands, base station 100 can simultaneously perform transmission of a DL signal and reception of a UL signal in a DL interval. Thus, it is made possible to enhance the transmission efficiency of UL signals and to suppress deterioration of the transmission quality.

According to the present embodiment, DL/UL selector 108 of base station 100 selects, for use of DL transmission, a channel having a relatively low carrier frequency from among the channels selected by channel selector 107. With this selection method, base station 100 can transmit a DL signal, using a channel having a relatively low propagation loss. Thus, it is made possible to suppress deterioration of the transmission quality of DL signals.

Note that, although the description has been given with the case where DL/UL selector 108 selects, for use of DL transmission, a channel having a relatively low carrier frequency from among the channels selected by channel selector 107 in the embodiment described above, the present disclosure is not limited to this case.

For example, UL/DL selector 108 may select, for use of DL transmission, a channel having a relatively low receiving level (the amount of interference) measured by interference measurer 106 from among the channels selected by channel selector 107. With this selection method, since base station 100 can transmit a DL signal, using a channel having a relatively low interference from another system, deterioration of the transmission quality of DL signals can be suppressed.

Alternatively, in a case where different Modulation and Coding Scheme (MCS) values are configured for available channels, UL/DL selector 108 may select, for each channel selected by channel selector 107, use of UL reception in a DL interval or use of DL transmission in the DL interval based on the MCS values.

For example, UL/DL selector 108 may select, for use of DL transmission, a channel having the largest MCS value from among the channels selected by channel selector 107. With this selection method, base station 100 can easily perform rate matching of a DL signal while suppressing the number of times the DL signal is transmitted (transmission time) in a DL interval. Note that, UL/DL selector 108 may select, for use of UL reception, a channel having the largest MCS value, in order to enhance the transmission efficiency of UL signals.

Alternatively, in a case where different numbers of transmission streams are configured for available channels, for example, a multiplexing method, such as spatial multiplexing, is applied to available channels, and in a case where the number of multiplexing layers differs, UL/DL selector 108 may select, for each channel selected by channel selector 107, use of UL reception in a DL interval or use of DL transmission in the DL interval based on the number of transmission streams.

For example, UL/DL selector 108 selects, for use of DL transmission, a channel having the largest number of transmission streams from among the channels selected by channel selector 107. With this selection method, base station 100 can enhance the transmission efficiency of DL signals while suppressing the number of times of transmission the DL signal is transmitted (transmission time) in a DL interval. Note that, UL/DL selector 108 may select, for use of UL reception, a channel having the largest number of transmission streams, in order to enhance the transmission efficiency of UL signals.

Alternatively, DL transmission may be performed alternately from each channel. Moreover, DL transmission may be performed from a specific channel normally, and DL transmission may be performed from at least one channel other than the specific channel, only when interference measurement is desired to be performed for the specific channel where normal DL transmission is performed. In a channel where only UL transmission is performed (channel $f_{22}$ in FIG. 5), a guard time may be placed on a frame boundary (boundary between frame # n and frame # n+1 in FIG. 5), and since no guard time is required for immediately before DL transmission (e.g., between UL signal and DL signal of channel $f_{11}$ in frame # n of FIG. 5), the guard time to be placed on the frame boundary can be configured longer by the amount corresponding to this guard time that has become unnecessary. For this reason, the guard time available for interference detection can be configured to have a longer period, and thus, the accuracy of interference detection can be improved.

Note that, the present disclosure is not limited to the example described with FIG. 5 although the example has been described as follows: base station 100 transmits a DL signal using channel $f_{11}$ and terminal apparatus 200 transmits a UL signal using channel $f_{22}$ in a case where channel $f_{11}$ and channel $f_{22}$ selected by base station 100 are included respectively in Band 1 and Band 2.

In a case where, for example, specific information is included in a DL signal, base station 100 may transmit a DL signal, using channel $f_{11}$ and channel $f_{22}$. Hereafter, an example of this case will be described as Variation 1 of the embodiment.

(Variation 1 of Embodiment)

Figure 11:
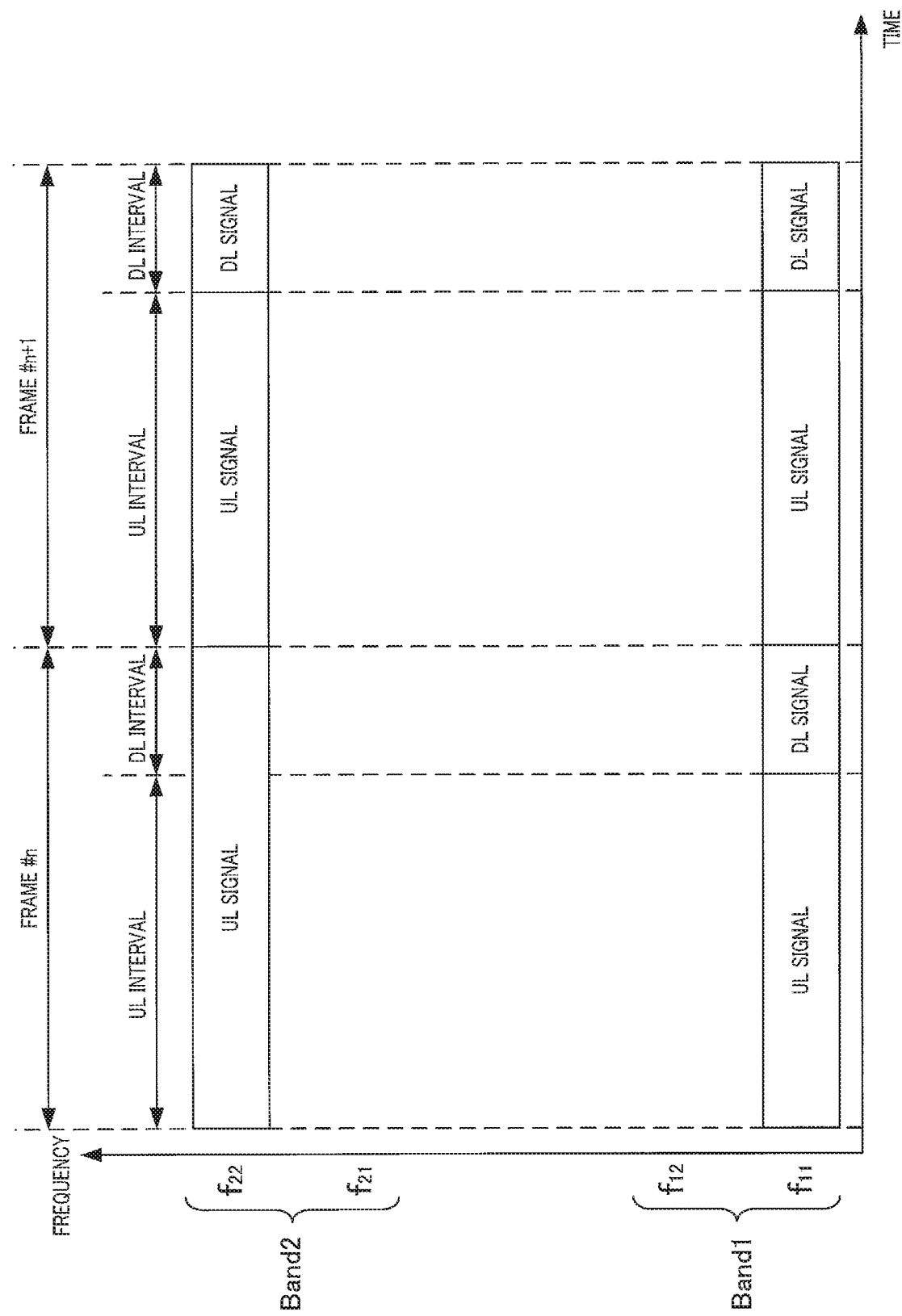
FIG. 11 is a diagram illustrating an example of transmission and reception signals according to Variation 1 of the embodiment of the present disclosure.

FIG. 11 is a diagram illustrating an example of transmission and reception signals according to Variation 1 of this embodiment.

In FIG. 11, the horizontal axis represents the time-axis and the vertical axis represents the frequency axis. FIG. 11 illustrates two frequency bands, which are Band 1 including channel $f_{11}$ and channel $f_{12}$ and Band 2 including channel $f_{21}$ and channel $f_{22}$ as illustrated in FIGS. 5 and 6. FIG. 11 illustrates two frames, which are the n-th frame ("n" is an integer equal to or greater than one) (frame # n) and the n+1-th frames (frame # n+1).

In the DL interval of frame # n in FIG. 11, as with the DL interval of frame # n in FIG. 5, base station 100 transmits a DL signal, using channel $f_{11}$ and terminal apparatus 200 transmits a UL signal, using channel $f_{22}$. Meanwhile, unlike the DL interval of frame # n+1 of FIG. 5, in the DL interval of frame # n+1 in FIG. 11, base station 100 transmits a DL signal, using channel $f_{11}$ and channel $f_{22}$. Identification information is included in the DL signals transmitted in the DL interval of frame # n+1.

The identification information is information that requires relatively good transmission quality among information indicated to terminal apparatus 200 from base station 100, and for example, is information indicating change of a channel used for transmission and reception of a UL signal and a DL signal. Moreover, at the time of interference detection, information relating to frequency, such as a frequency ID used for communication and/or information indicating a frequency change, needs to be indicated to terminal apparatus 200 from base station 100, and this information relating to the frequency, such as the frequency ID used for communication and/or information indicating a frequency change may be set to be the identification information.

Transmission of DL signals, using channel $f_{11}$ and channel $f_{22}$, may be periodically performed, for example, once in every two frames or once in every three frames. In this case, the transmission period of DL signals, using channel $f_{11}$ and channel $f_{22}$, is known in advance between base station 100 and terminal apparatus 200.

Alternatively, base station 100 may indicate, to terminal apparatus 200, channel information indicating transmission of DL signals, using channel $f_{11}$ and channel $f_{22}$ in the DL interval of the next frame (frame # n+1 in FIG. 11), for example, using a DL signal transmitted using channel $f_{11}$ in the DL interval of the frame (frame # n in FIG. 11) before the next frame.

Next, the case where the channel information indicated to terminal apparatus 200 has the format of the channel information in FIG. 7 will be described in the example of FIG. 11.

For example, channel #1 and channel #2 in the channel information of FIG. 7 correspond to channel $f_{11}$ and channel $f_{22}$ of FIG. 11, respectively. In FIG. 11, the channels to be used between frame # n and frame # n+1 are not changed. In this case, the channel ID of channel #1 and the channel ID of channel #2, which are included in the channel information in the DL signals transmitted from base station 100 in the DL interval of frame # n, become the ID of channel $f_{11}$ and the ID of channel $f_{22}$, respectively. Furthermore, the identification information on channel #1 and the identification information on channel #2 are each set to "0."

Since transmission and reception of a DL signal are performed in the DL interval of frame # n+1, using channel $f_{11}$, the DL/UL identification information on channel #1 is set to "0." Since transmission and reception of a DL signal are performed in the DL interval of frame # n+1 using channel $f_{22}$, the DL/UL identification information on channel #2 is set to "0."

When receiving the DL signals including the DL/UL identification information on channel #1 and the DL/UL identification information on channel #2, which have been each set to "0," in the DL interval of frame # n, terminal apparatus 200 can receive the DL signals, using both channel #1 and channel #2 in the DL interval of frame # n+1 even in a case where channel #1 and channel #2 are included in different frequency bands.

Next, in the example of FIG. 11, a case will be described, where the channel information indicated to terminal apparatus 200 has the format of channel information in FIG. 8.

For example, channel #1 and channel #2 in the channel information of FIG. 8 correspond to channel $f_{11}$ and channel $f_{22}$ of FIG. 11, respectively. In FIG. 11, the channels used between frame # n and frame # n+1 are not changed. In this case, the channel ID of channel #1 and the channel ID of channel #2, which are included in the DL signals transmitted from base station 100 in the DL interval of frame # n, become the ID of channel $f_{11}$ and the ID of channel $f_{22}$, respectively.

DL transmission band information is information indicating the frequency band in which base station 100 transmits a DL signal as in the embodiment described above. In the embodiment described above, when the two frequency bands, Band 1 and Band 2, are available, a DL signal is transmitted using a channel included in one of the frequency bands, so that the DL transmission band information is represented by one bit. In Variation 1 of this embodiment, there are two cases where a DL signal is transmitted using the channel included in either one of the frequency bands and where DL signals are transmitted using the channels respectively included in both of the frequency bands, so that the DL transmission band information is represented by two bits.

For example, when base station 100 transmits a DL signal, using a channel included in Band 1, the DL transmission band information is set to "00," and when base station 100 transmits a DL signal, using a channel included in Band 2, the DL transmission band information is set to "01." Furthermore, when base station 100 transmits DL signals, using channels included in Band 1 and Band 2, the DL transmission band information is set to "11."

When receiving a DL signal including DL transmission band information set to "11" in the DL interval of frame # n, terminal apparatus 200 receives DL signals, using both channels in the DL interval of frame # n+1, even when channel #1 and channel #2 are included in different frequency bands.

As described above, according to Variation 1 of this embodiment, when transmitting specific information to terminal apparatus 200, base station 100 transmits a DL signal including the specific information to terminal apparatus 200, using a plurality of channels included in different frequency bands, even when a plurality of channels selected by base station 100 are included in different frequency bands. With this configuration, the transmission quality of the DL signals including specific information can be enhanced.

In Variation 1 of this embodiment described above, an example of the case has been described, where base station 100 transmits a DL signal including specific information to terminal apparatus 200, but the present disclosure is not limited to this case. For example, in a case where the transmission quality of DL signals is poor, base station 100 may transmit the DL signals to terminal apparatus 200, using a plurality of channels included in different frequency bands. Note that, the case where the transmission quality of DL signals is poor is a case where the transmission quality (e.g., RSSI) of the DL signals is not greater than a threshold or a case where base station 100 has received, a plurality of times in a row from terminal apparatus 200, a response (e.g., NACK) indicating that the DL signal is not receivable.

In Variation 1 of this embodiment described above, as an example, the case has been described where, base station 100 selects two channels in a case where two frequency bands are available and each of the frequency bands includes two channels in the radio communication system including base station 100 and terminal apparatus 200. Hereinafter, in Variation 2 of this embodiment described above, a description will be given of an example in which base station 100 selects three channels in a case where two frequency bands are available and each of the frequency bands includes two channels in a radio communication system including base station 100 and terminal apparatus 200.

(Variation 2 of Present Embodiment)

In a case where channel selector 107 of base station 100 selects three channels, DL/UL selector 108 of base station 100 selects transmission of a DL signal, using a channel of a frequency band having a smaller number of selected channels between two frequency bands.

Figure 12:
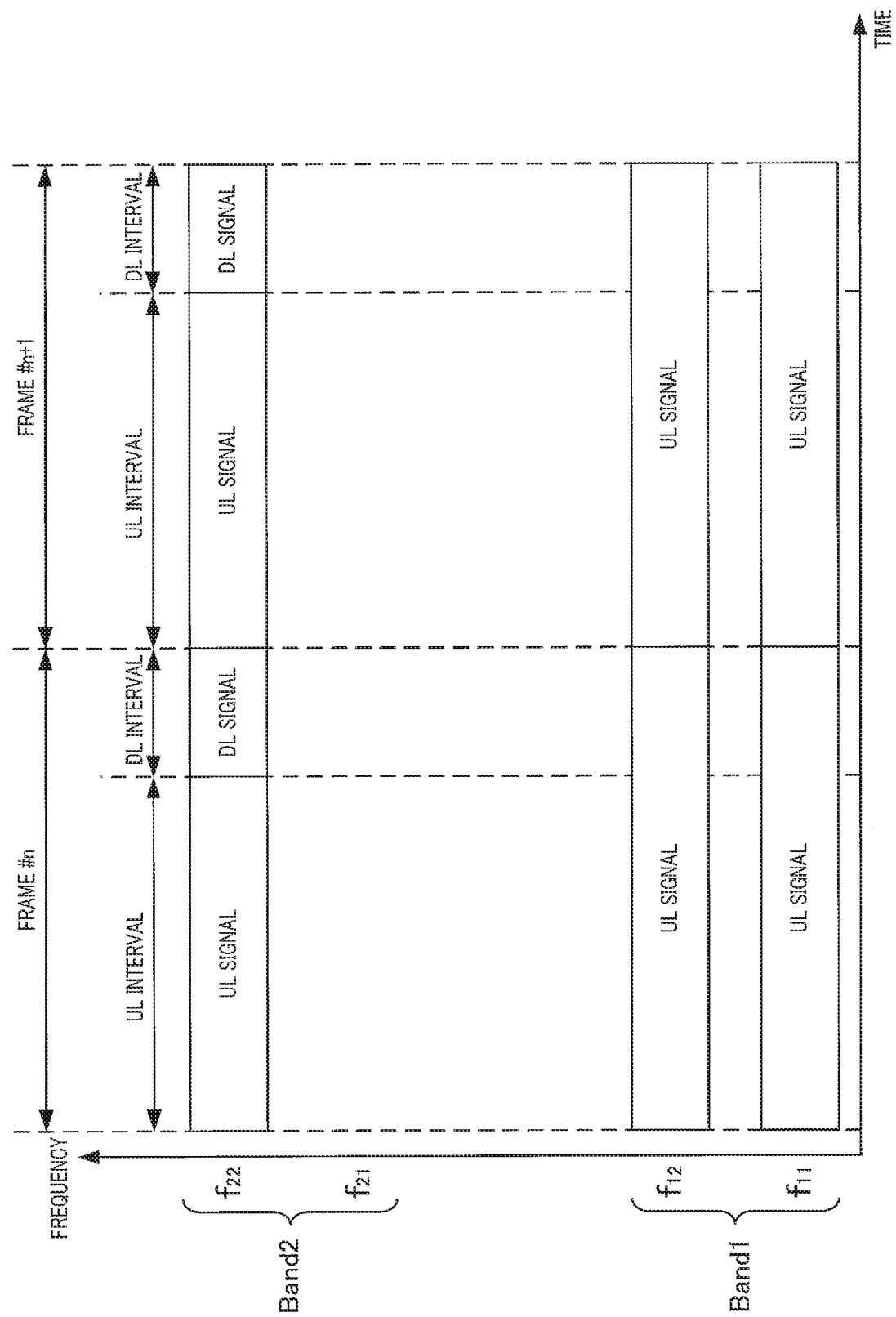
FIG. 12 is a diagram illustrating an example of transmission and reception signals according to Variation 2 of the embodiment of the present disclosure.

FIG. 12 is a diagram illustrating an example of transmission and reception signals according to Variation 2 of the present embodiment.

In FIG. 12, the horizontal axis represents the time and the vertical axis represents the frequency. In FIG. 12, two frequency bands, which are Band 1 including channel $f_{11}$ and channel $f_{12}$ and Band 2 including channel $f_{21}$ and channel $f_{22}$, are illustrated. Moreover, in FIG. 12, two frames are illustrated, which are the n-th frame (n is an integer equal to or greater than one) (frame # n) and the n+1-th frame (frame # n+1).

FIG. 12 illustrates an example of a transmission signal of a case where base station 100 selects channel $f_{11}$ and channel $f_{12}$ included in Band 1, and channel $f_{22}$ included in Band 2. In a case where the channels selected by base station 100 are included in different frequency bands while two or more channels selected by base station 100 are included in one frequency band, base station 100 transmits a DL signal using a channel of the frequency band having a smaller number of channels selected by base station 100.

In the example of FIG. 12, since the number of the channels included in Band 1 is two and the number of the channels included in Band 2 is one, base station 100 transmits a DL signal, using channel $f_{22}$, and terminal apparatus 200 transmits UL signals, using channel $f_{11}$ and channel $f_{12}$ included in Band 1 in the DL interval. Base station 100 receives, using channel $f_{11}$ and channel $f_{12}$, the UL signals transmitted by terminal apparatus 200, and terminal apparatus 200 receives, using channel $f_{22}$, the DL signal transmitted by base station 100.

As described above, according to Variation 2 of this embodiment, in a case where a plurality of selected channels are included in different frequency bands and two or more channels are included in one frequency band, base station 100 transmits a DL signal, using a channel of the frequency band having a smaller number of channels included in each of the frequency bands in a DL interval. With this configuration, transmission of a DL signal and reception of a UL signal can be simultaneously performed using a plurality of channels, and the number of times the DL signal is transmitted (transmission time) can be suppressed in a DL interval. Thus, the transmission efficiency of UL signals can be further enhanced and deterioration of the transmission quality of UL signals can be suppressed.

Although the example is illustrated in FIG. 12, in which a DL signal is transmitted using a channel of a frequency band having a smaller number of channels included in each of the frequency bands, the present disclosure is not limited to this example.

For example, a DL signal may be transmitted using a channel of a frequency band having a larger number of channels included in each of the frequency bands. Hereinafter, a description will be given of this example as Variation 3 of this embodiment.

(Variation 3 of Embodiment)

Figure 13:
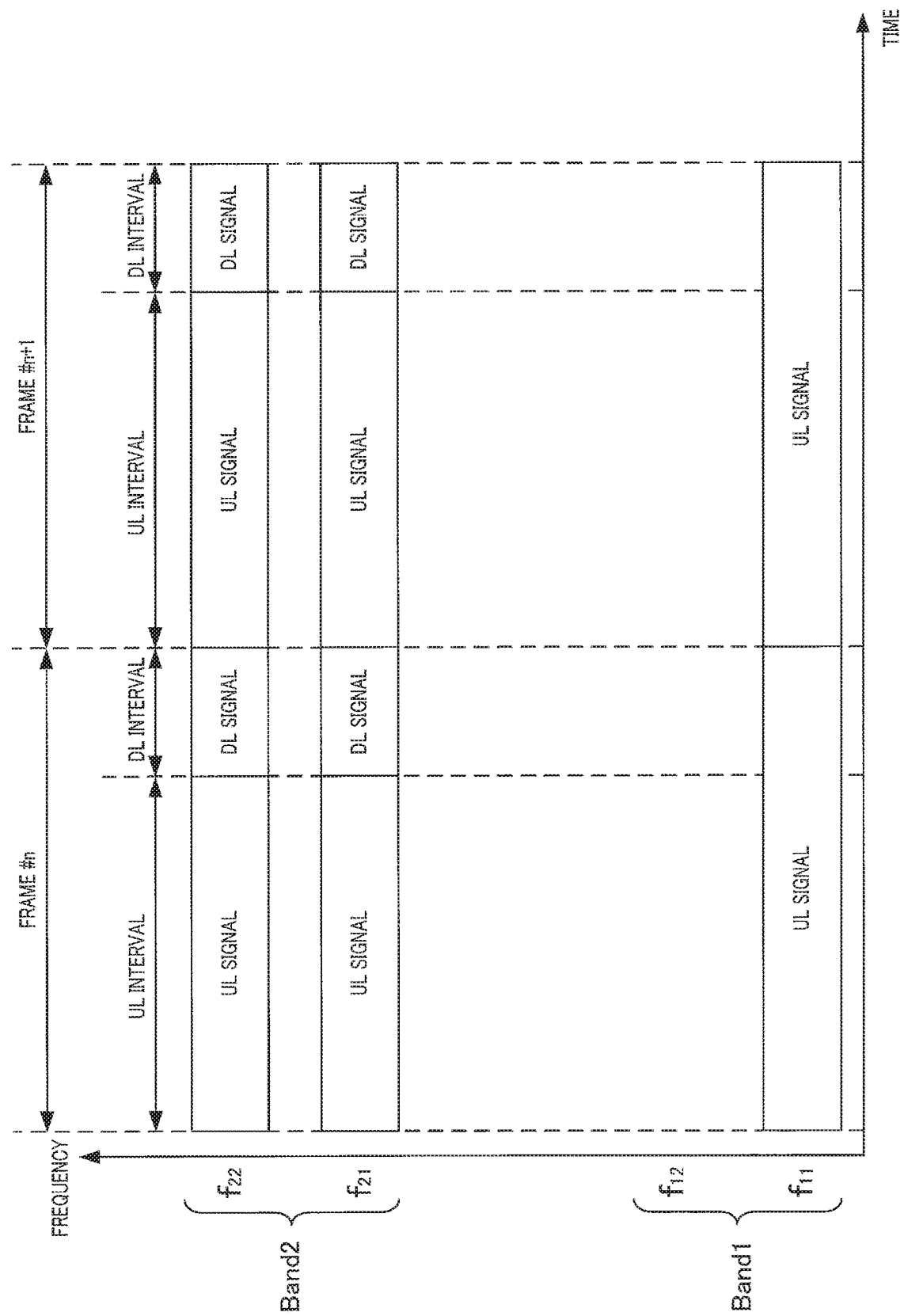
FIG. 13 is a diagram illustrating an example of transmission and reception signals according to Variation 3 of the embodiment of the present disclosure.

FIG. 13 is a diagram illustrating an example of transmission and reception signals according to Variation 3 of this embodiment.

In FIG. 13, the horizontal axis represents the time and the vertical axis represents the frequency. In FIG. 13, two frequency bands, which are Band 1 including channel $f_{11}$ and channel $f_{12}$ and Band 2 including channel $f_{21}$ and channel $f_{22}$, are illustrated. Moreover, in FIG. 13, two frames are illustrated, which are the n-th frame (n is an integer equal to or greater than one) (frame # n) and the n+1-th frame (frame # n+1).

FIG. 13 illustrates an example of transmission and reception signals of a case where base station 100 selects channel $f_t$ included in Band 1 and channel $f_{21}$ and channel $f_{22}$ included in Band 2. In a case where the channels selected by base station 100 are included in different frequency bands and two or more channels selected by base station 100 are included in one frequency band, base station 100 transmits, in a DL interval, a DL signal using a channel of a frequency band that has a larger number of channels included in each of the frequency bands and selected by base station 100 in Variation 3 of the present embodiment.

In the example of FIG. 13, since the number of the channels included in Band 1 is one and the number of the channels included in Band 2 is two, base station 100 transmits a DL signal, using channel $f_{21}$ and channel $f_{22}$ included in Band 2 and terminal apparatus 200 transmits a UL signal, using channel $f_{11}$ included in Band 1 in the DL intervals. Base station 100 receives, using channel $f_{11}$, the UL signal transmitted by terminal apparatus 200 and terminal apparatus 200 receives, using channel $f_{21}$ and channel $f_{22}$, the DL signals transmitted by base station 100.

As described above, according to Variation 3 of this embodiment, in a case where a plurality of selected channels are included in different frequency bands and two or more channels are included in one frequency band, base station 100 transmits a DL signal, using a channel of the frequency band having a larger number of channels included in each of the frequency bands in a DL interval. With this configuration, transmission of a DL signal and reception of a UL signal can be simultaneously performed using a plurality of channels in a DL interval, and the number of times the DL signal is transmitted (transmission time) can be increased. Thus, the transmission efficiency of UL signals can be further enhanced and deterioration of the transmission quality of DL signals can be suppressed.

In the embodiment and each variation described above, the cases have been described, where two frequency bands are available and each of the frequency bands includes two channels in a radio communication system having base station 100 and terminal apparatus 200. Hereafter, in Variation 4 of this embodiment, a case will be described where two frequency bands are available and one frequency band includes three or more channels in a radio communication system having base station 100 and terminal apparatus 200.

(Variation 4 of Embodiment)

Figure 14:
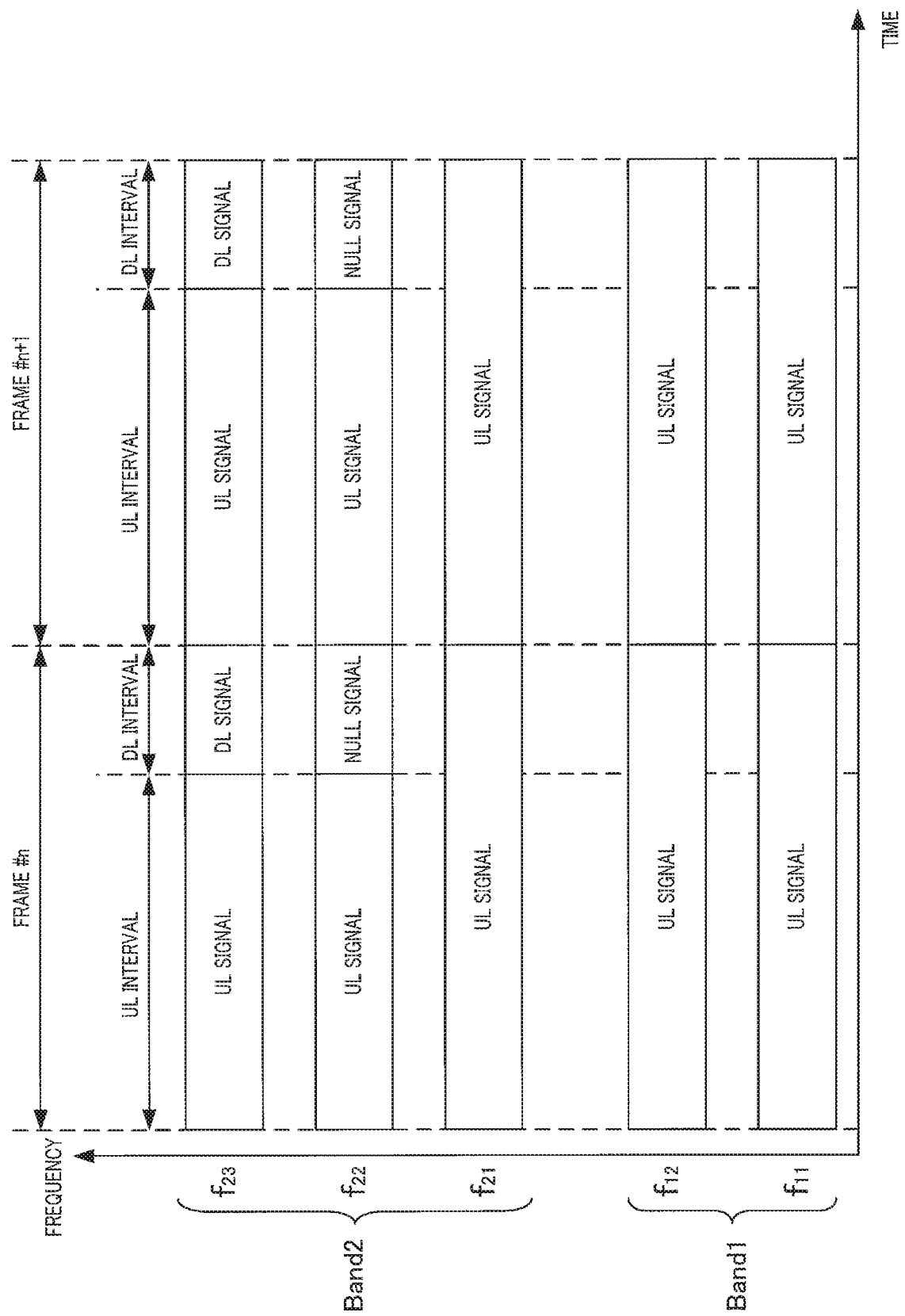
FIG. 14 is a diagram illustrating an example of transmission and reception signals according to Variation 4 of the embodiment of the present disclosure.

FIG. 14 is a diagram illustrating an example of transmission and reception signals according to Variation 4 of this embodiment.

In FIG. 14, the horizontal axis represents the time and the vertical axis represents the frequency. In FIG. 14, two frequency bands, which are Band 1 including channel $f_{11}$ and channel $f_{12}$ and Band 2 including channel $f_{21}$, channel $f_{22}$ and channel $f_{23}$, are illustrated. Moreover, in FIG. 14, two frames are illustrated, which are the n-th frame (n is an integer equal to or greater than one) (frame # n) and the n+1-th frame (frame # n+1).

FIG. 14 illustrates an example of transmission and reception signals of a case where base station 100 selects channel $f_{11}$ and channel $f_{12}$ included in Band 1 and channel $f_{21}$, channel $f_{22}$ and channel $f_{23}$ included in Band 2. As illustrated in FIG. 14, the channels selected by base station 100 are included in different frequency bands. There is a frequency band including three or more channels selected by base station 100 (Band 2 in FIG. 14).

In this case, base station 100 transmits a DL signal, using at least one of the channels in the frequency band including three or more channels and transmits a null signal, using a channel adjacent to the channel for transmitting the DL signal in the DL intervals. More specifically, base station 100 transmits a DL signal, using channel $f_{23}$ and transmits a null signal, using channel $f_{22}$ adjacent to channel $f_{23}$ in the DL intervals (i.e., channel $f_{23}$ is set to non-transmission in the DL intervals). Meanwhile, terminal apparatus 200 transmits UL signals, using channel $f_{11}$ and channel $f_{12}$, and transmits a UL signal, using channel $f_{21}$ not adjacent to channel $f_{23}$ used for transmitting the DL signal.

Note that, in a case where there is a frequency band including three or more channels (channel $f_{21}$, channel $f_{22}$ and channel $f_{23}$ in FIG. 14) selected by base station 100, base station 100 preferably transmits a DL signal using a channel of the lowest carrier frequency or a channel of the highest carrier frequency among the frequency bands in a DL interval. When there is a channel of the lowest carrier frequency or a channel of the highest carrier frequency, the number of adjacent channels can be limited to one, so that the number of channels transmitting a null signal (i.e., channel neither transmitting a DL signal nor a UL signal) can be limited to one.

In the example of FIG. 14, base station 100 transmits a null signal, using channel $f_{22}$. In such a case, base station 100 transmits, to terminal apparatus 200, channel information including the information on the channel which transmits a null signal. The information on the channel which transmits a null signal may be explicitly indicated to terminal apparatus 200 or implicitly indicated to terminal apparatus 200.

<Specific Example of Channel Information in Variation 4 of Embodiment>

Figure 15:
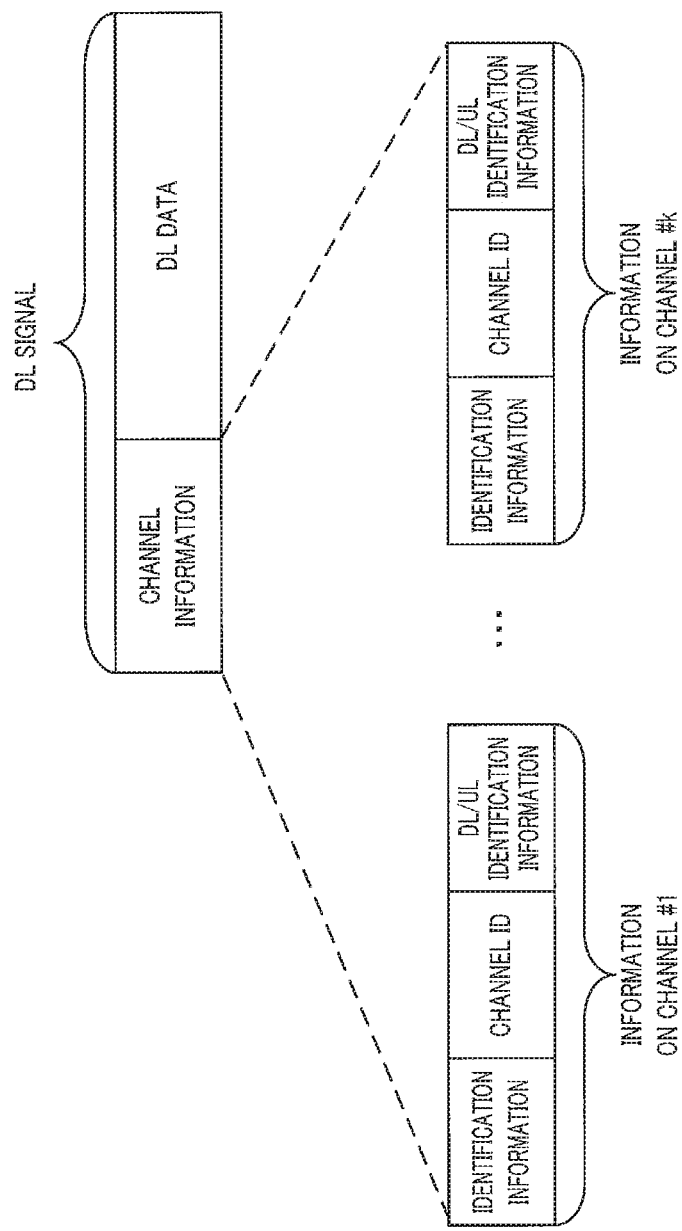
FIG. 15 is a diagram illustrating a third example of a format of channel information included in a DL signal.

FIG. 15 is a diagram illustrating the third example of a format of the channel information included in a DL signal. Note that, the channel information in FIG. 15 is information of a case where base station 100 selects k channels (k is an integer equal to or greater than three).

The channel information in FIG. 15 includes the information on channel #1 to channel # k. The information on each channel includes identification information, a channel ID, and DL/UL identification information. Note that, the identification information and the channel ID are similar to those described in FIG. 7, and since the description has been already given in the embodiment, a detailed description will be omitted herein.

In the channel information on FIG. 15, the setting method of DL/UL identification information differs from the method described in the embodiment.

More specifically, the DL/UL identification information in the channel information in FIG. 15 is 2-bit information for identifying whether transmission and reception of a DL signal are performed, transmission and reception of a UL signal are performed or transmission and reception of a null signal are performed (i.e., a non-transmission interval is set) using each channel in a DL interval.

For example, in a case where transmission and reception of a DL signal are performed using channel #1 in the DL interval, the DL/UL identification information included in the information on channel #1 is set to "00." In a case where transmission and reception of a UL signal are performed using channel #1 in the DL interval, the DL/UL identification information included in the information on channel #1 is set to "01." Moreover, in a case where transmission and reception of a null signal are performed using channel #1 in the DL interval (i.e., a non-transmission interval is set), the DL/UL identification information included in the information on channel #1 is set to "10."

In the format of FIG. 15, the information on the channel which transmits a null signal is explicitly indicated to terminal apparatus 200.

Figure 16:
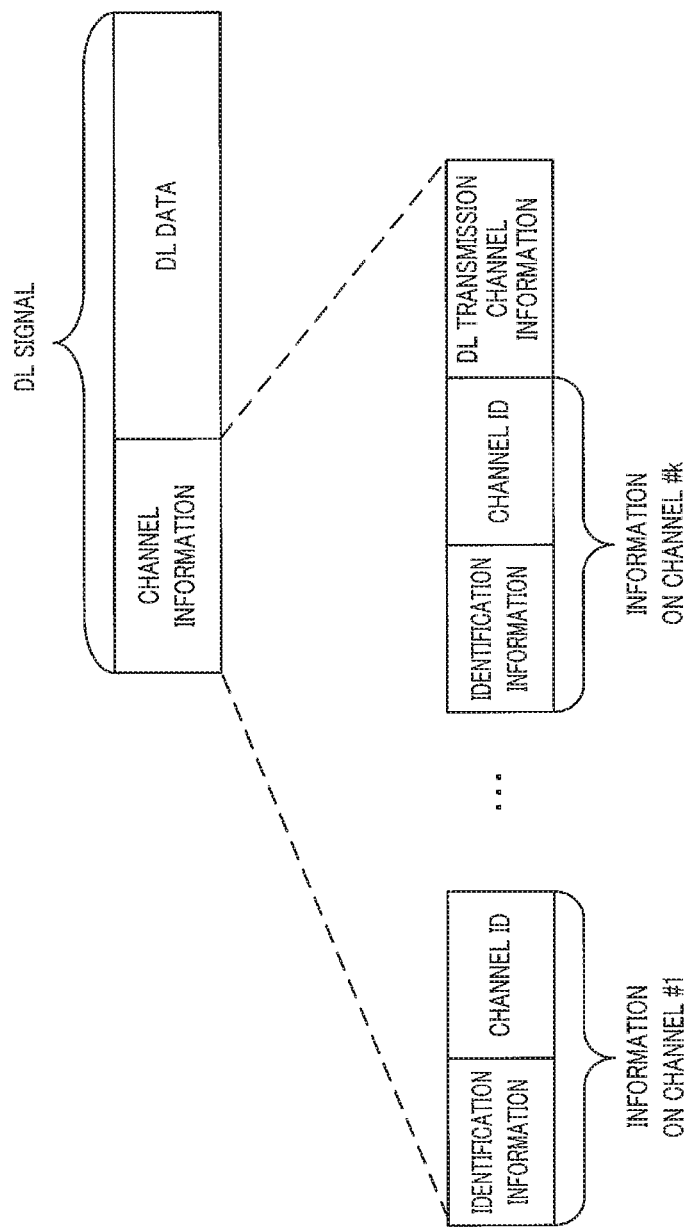
FIG. 16 is a diagram illustrating a fourth example of a format of channel information included in a DL signal.

FIG. 16 is a diagram illustrating the fourth example of a format of the channel information included in a DL signal. Note that, the channel information in FIG. 16 is information of a case where base station 100 selects k channels (k is an integer equal to or greater than three) as in FIG. 15.

The channel information in FIG. 16 includes the information on channel #1 to channel # k, and DL transmission channel information. The information on each channel includes identification information and a channel ID. Note that, the identification information and the channel ID are similar to those described in FIG. 7, and since the description has been already given in the embodiment, a detailed description will be omitted herein.

While the DL/UL identification information is included in the information on a plurality of channels (channel #1 to channel # k), the channel information in FIG. 16 includes DL transmission channel information instead of the DL/UL identification information.

DL transmission channel information is information indicating the channel by which base station 100 transmits a DL signal. For example, as illustrated in FIG. 14, when base station 100 selects five channels (i.e., case where k=5), the DL transmission channel information is represented by three bits. Base station 100 sets the DL transmission channel information based on the channel by which a DL signal is transmitted. For example, an assumption is made that channel $f_{11}$, channel $f_{12}$, channel $f_{21}$, channel $f_{22}$, and channel $f_{23}$ are associated with the following pieces of 3-bit information of "000," "001," "010," "011," and "100," respectively. Base station 100 selects channel $f_{11}$, channel $f_{12}$, channel $f_{21}$, channel $f_{22}$, and channel $f_{23}$, and transmits a DL signal, using channel $f_{23}$. In this case, base station 100 sets the DL transmission channel information to "100."

In the method described using FIG. 16, transmitting a null signal, using a channel adjacent to a channel by which a DL signal is transmitted from base station 100 is previously known between base station 100 and terminal apparatus 200. The information on the channel by which the null signal is transmitted is implicitly indicated to terminal apparatus 200.

Therefore, terminal apparatus 200 determines, when acquiring the channel information, a channel selected by base station 100 and a channel by which a DL signal is transmitted from base station 100. Terminal apparatus 200 transmits a UL signal, using a channel excluding the channel by which the DL signal is transmitted from base station 100 and a channel adjacent to the channel by which the DL signal is transmitted from base station 100.

Figure 17:
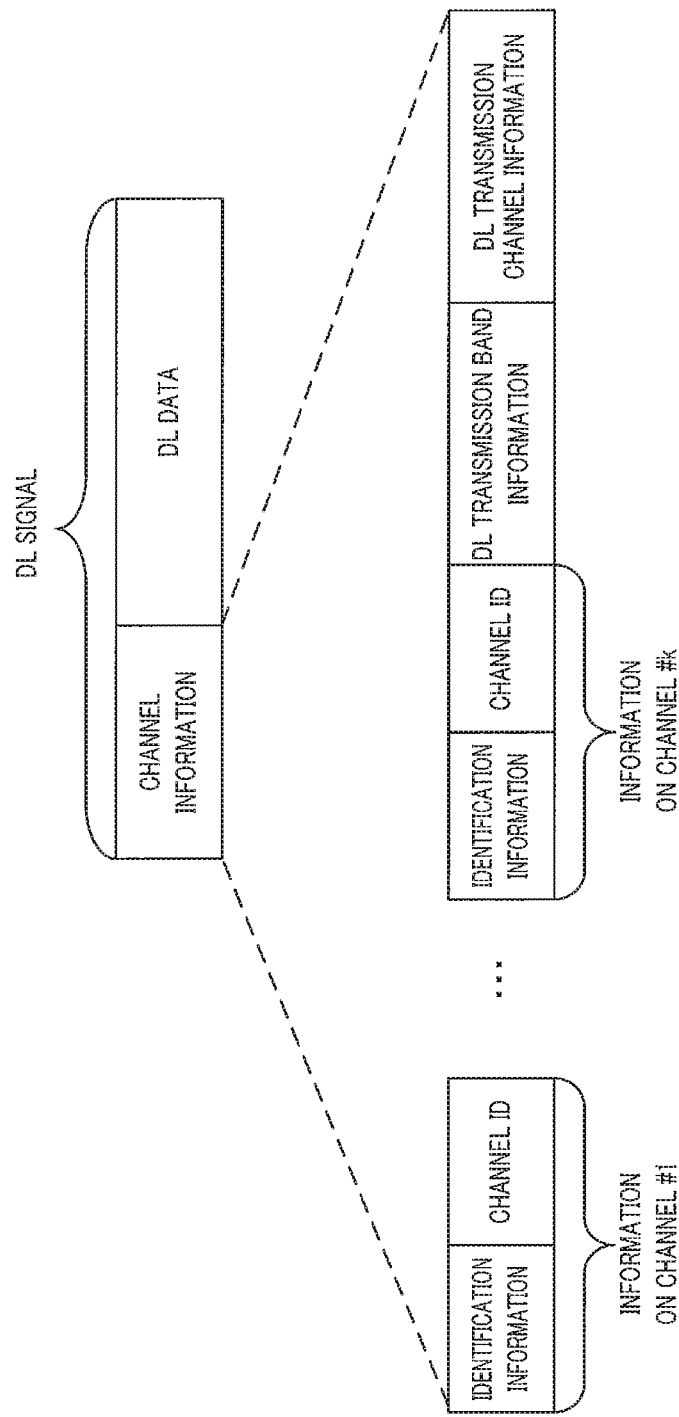
FIG. 17 is a diagram illustrating a fifth example of a format of channel information included in a DL signal.

FIG. 17 is a diagram illustrating the fifth example of a format of the channel information included in a DL signal. The channel information in FIG. 17 is information of a case where base station 100 selects k channels (k is an integer equal to or greater than three) as in FIG. 15.

The channel information in FIG. 17 includes the information on channel #1 to channel # k, DL transmission band information, and DL transmission channel information. The information on each channel includes identification information and a channel ID. Note that, the identification information and the channel ID are similar to those described in FIG. 7, and since the description has been already given in the embodiment, a detailed description will be omitted herein.

DL transmission band information is information indicating the frequency band in which base station 100 transmits a DL signal. For example, as illustrated in FIG. 14, when two frequency bands, Band 1 and Band 2 are available, DL transmission band information is represented by one bit. When base station 100 transmits a DL signal, using a channel included in Band 1, the DL transmission band information is set to "0," and when base station 100 transmits a DL signal, using a channel included in Band 2, DL transmission band information is set to "1." Note that, when three or more frequency bands are available, DL transmission band information may be two bits or greater than two bits.

DL transmission channel information is information indicating the position of a channel where base station 100 transmits a DL signal in the frequency band indicated by DL transmission band information.

For example, in a case where the channel by which base station 100 transmits a DL signal is limited to a channel of the highest carrier frequency or a channel of the lowest carrier frequency among the frequency bands indicated by the DL transmission band information, the DL transmission channel information is represented by one bit. In a case where the channel by which base station 100 transmits a DL signal is a channel of the highest carrier frequency, the DL transmission channel information is set to "1," and in a case where the channel by which base station 100 transmits a DL signal is a channel of the lowest carrier frequency, the DL transmission band information is set to "0."

In the method described using FIG. 17, transmitting a null signal using a channel adjacent to the channel by which base station 100 transmits a DL signal is previously known between base station 100 and terminal apparatus 200. The information on the channel by which a null signal is transmitted is implicitly indicated to terminal apparatus 200.

The channel information in FIG. 17 can be reduced in size (number of bits) as compared with the channel information in FIGS. 15 and 16.

As described above, according to Variation 4 of this embodiment, in a case where a plurality of selected channels are included in different frequency bands and three or more channels are included in one frequency band, base station 100 transmits a DL signal, using one channel in the frequency band including three or more channels, and transmits a null signal, using a channel adjacent to the channel by which the DL signal is transmitted in a DL interval. As a result, terminal apparatus 200 can transmit a UL signal, using a channel not adjacent to the channel by which base station 100 transmits a DL signal in the DL interval. Thus, it is made possible to enhance the transmission efficiency of UL signals and to suppress deterioration of the transmission quality.

In Variation 4 of this embodiment, the example has been described where, in a case where a plurality of channels selected by base station 100 are included in different frequency bands and three or more channels are included in one frequency band, a null signal is transmitted using a channel adjacent to the channel by which a DL signal is transmitted in a DL interval. Hereinafter, in Variation 5 of the embodiment, an example will be described where, in a case where a plurality of channels selected by base station 100 are included in one frequency band, a null signal is transmitted using a channel adjacent to the channel by which a DL signal is transmitted.

(Variation 5 of Embodiment)

Figure 18:
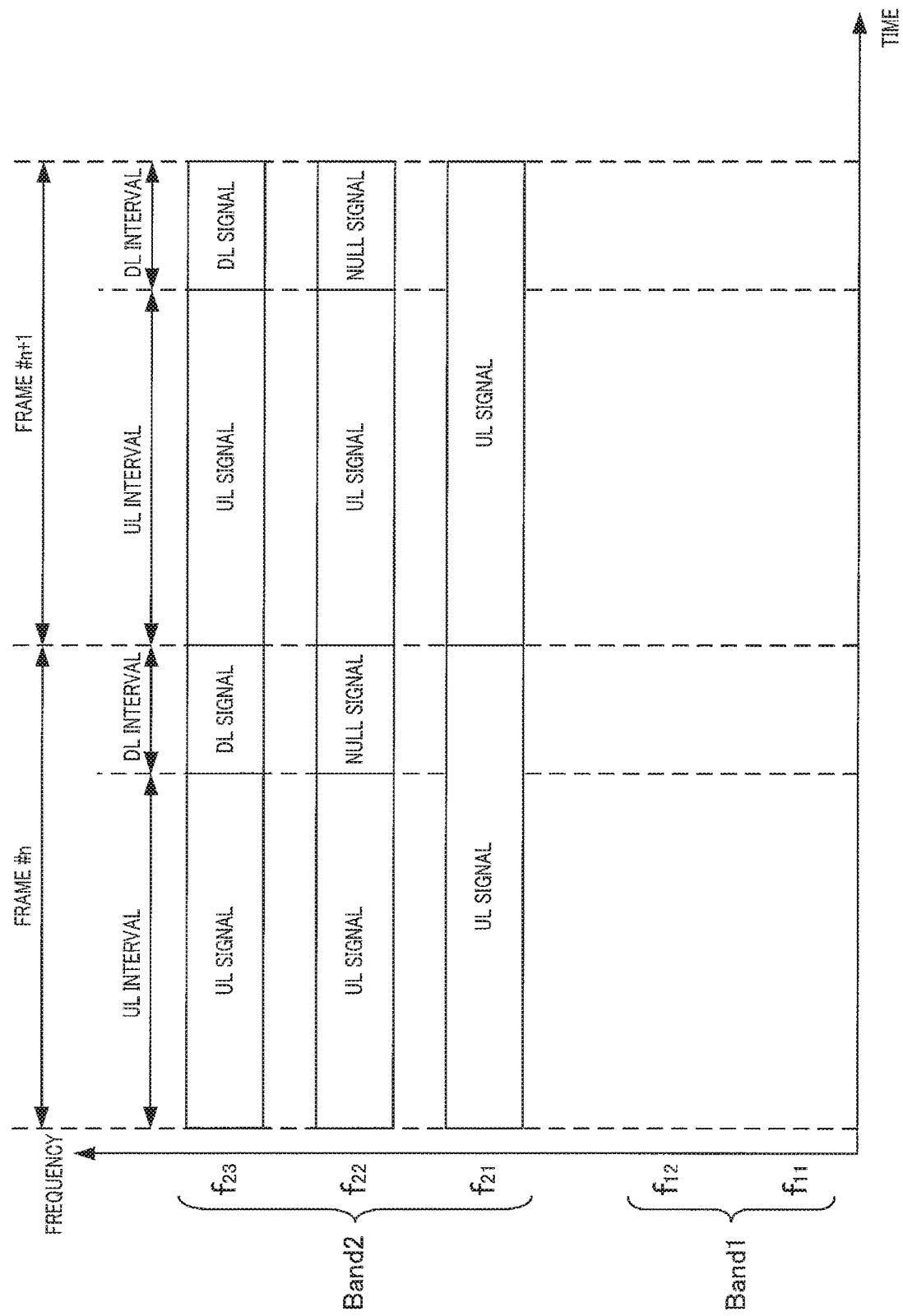
FIG. 18 is a diagram illustrating an example of transmission and reception signals according to Variation 5 of the embodiment of the present disclosure.

FIG. 18 is a diagram illustrating an example of transmission and reception signals according to Variation 5 of this embodiment.

In FIG. 18, the horizontal axis represents the time and the vertical axis represents the frequency. In FIG. 18, two frequency bands, which are Band 1 including channel $f_{11}$ and channel $f_{12}$ and Band 2 including channel $f_{21}$, channel $f_{22}$ and channel $f_{23}$, are illustrated. Moreover, in FIG. 18, two frames are illustrated, which are the n-th frame (n is an integer equal to or greater than one) (frame # n) and the n+1-th frame (frame # n+1).

FIG. 18 illustrates an example of transmission and reception signals of a case where base station 100 selects channel $f_{21}$, channel $f_{22}$ and channel $f_{23}$ included in Band 2.

In this case, base station 100 transmits a DL signal, using at least one channel in the frequency band including three or more channels, and transmits a null signal, using a channel adjacent to the channel by which the DL signal is transmitted in a DL interval. More specifically, as illustrated in FIG. 18, base station 100 transmits a DL signal, using channel $f_{23}$ and transmits a null signal, using channel $f_{22}$ adjacent to channel $f_{23}$ in the DL interval (i.e., channel $f_{22}$ is configured to be non-transmission in the DL interval). Furthermore, in the DL interval, terminal apparatus 200 transmits a UL signal, using channel $f_{21}$ not adjacent to channel $f_{23}$ by which the DL signal is transmitted.

As described above, according to Variation 5 of this embodiment, even in a case where three or more selected channels are included in one frequency band, base station 100 transmits a DL signal, using one channel in the frequency band including the three or more channels, and transmits a null signal, using a channel adjacent to the channel in which the DL signal is transmitted in a DL interval. As a result, terminal apparatus 200 can transmit a UL signal, using a channel not adjacent to the channel by which the DL signal is transmitted by base station 100. Thus, it is made possible to enhance the transmission efficiency of UL signals and to suppress deterioration of the transmission quality.

Note that, the embodiment and variations described above may be combined as appropriate and may be switched between each other as appropriate.

Although the example in which channel information is included in a DL signal has been described in the embodiment and variations described above, the present disclosure is not limited to this example. For example, the channel information may be transmitted to a terminal apparatus, using a DL preamble by preparing a plurality of patterns of preambles to be added to a DL signal and setting a correspondence relationship between each of the DL preamble patterns and channel information to be previously known between the base station and the terminal apparatus. As a method for changing the pattern of a DL preamble, a method of changing subcarrier mapping in an OFDM signal and a method for configuring a DL preamble to be a periodic signal and changing the polarity of a part of an interval of the periodic signal and/or the like can be cited, for example.

Moreover, in the embodiments and variations described above, although the example has been described, where channel selector 107 of base station 100 selects a channel for use of communication based on a result of interference measurement and UL/DL selector 108 selects UL reception or DL transmission, the present disclosure is not limited to this example. For example, base station 100 and terminal apparatus 200 may communicate with each other, using a previously configured channel and need not change the previously configured channel to another channel. In this case, UL/DL selector 108 of base station 100 may select, for the previously configured channel, use of UL reception in a DL interval or use of DL transmission in the DL interval. It is also possible to previously configure UL reception and DL transmission for the previously configured channel.

For example, in a case where a configuration indicating a channel used for communication and indicating for which one of UL reception and DL transmission in a DL interval the channel is to be used is previously known between base station 100 and terminal apparatus 200, base station 100 need not transmit channel information to terminal apparatus 200.

The number of available frequency bands and the number of channels included in each frequency band in the embodiments and variations described above are only exemplary, and the present disclosure is not limited to these numbers. For example, the number of available frequency bands may be three or more, and the number of channels included in each frequency band may be three or more, and may be one. The numbers of channels included in frequency bands may be different from each other.

Although a description of a variety of embodiments has been given thus far with reference to the drawings, the present disclosure is not limited to these examples. Obviously, a person skilled in the art can conceive a variety of modified examples or corrected examples within a range described in the claims, and it is to be understood that these modified examples and corrected example naturally belong to a technical scope of the present disclosure. Moreover, the configuration elements in the embodiment may be optionally combined within a range not departing from the gist of the disclosure.

Although the description has been given with an example of a case where an aspect of the present disclosure is formed by hardware in each embodiment described above, the present disclosure can be realized by software in cooperation with hardware.

Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

Moreover, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

Moreover, if future integrated circuit technology replaces LSIs as a result of the advancement of semiconductor technology or other derivative technology, the functional blocks could be integrated using the future integrated circuit technology. Biotechnology can also be applied.

Note that, the present disclosure can be expressed as a radio communication apparatus or a control method performed in a control apparatus. Moreover, the present disclosure can be expressed as a program causing a computer to perform the control method. Furthermore, the present disclosure can be represented as a recording medium in which the program is recorded in a computer-readable manner. More specifically, the present disclosure can be expressed in any of categories including an apparatus, a method, a program, and a recording medium.

The present disclosure is not limited to the embodiments in types of components, arrangement of components, or the number of components, for example, and such types, arrangement and the number of components can be changed, including appropriate replacement of one or more of the configuration elements with an element producing an equivalent operational effect, for example, as appropriate within a range not departing from the gist of the invention.

INDUSTRIAL APPLICABILITY

The present disclosure is suitable for use in terminal apparatuses and/or base stations, such as FPUs.

REFERENCE SIGNS LIST

100 Base Station
101, 201 Transmission/reception switcher
102-1 to 102-M, and 202-1 to 202-N Radio receiver
103, 203 Baseband reception processor
104, 204 AGC/synchronous detector
105, 205 Reception processing controller
106 Interference measurer
107 Channel selector
108 UL/DL selector
109 Channel information generator
110, 207 Baseband transmission processor
111, 208 Preamble generator
112, 209 Adder
113-1 to 113-N, 210-1 to 210-M Radio transmitter
114, 211 Receiver
115, 212 Transmitter
200 Terminal apparatus
206 Channel information extractor

The invention claimed is:

1. A base station that performs radio communication of a time-division-duplex scheme with a terminal apparatus, using any of a plurality of channels included in each of a plurality of frequency bands, the base station comprising:
a channel selector that selects a plurality of use channels to be used for the radio communication;
a transmitter that transmits a downlink signal to the terminal apparatus;
a receiver that receives an uplink signal from the terminal apparatus; and
an uplink/downlink (UL/DL) selector that selects whether the transmitter transmits the downlink signal in a transmission interval of the downlink signal using at least one of the plurality of use channels or the receiver receives the uplink signal in the transmission interval of the downlink signal using at least another one of the plurality of use channels that is not adjacent to the at least one of the plurality of use channels, based on whether the plurality of use channels are included in different frequency bands or in the same frequency band.

2. The base station according to claim 1,
wherein in a case where the plurality of use channels are included in mutually different frequency bands, the transmitter transmits the downlink signal in the transmission interval of the downlink signal, using the at least one of the plurality of use channels that is included in one of the different frequency bands, and the receiver receives the uplink signal in the transmission interval of the downlink signal, using the at least another one of the plurality of use channels that is included in at least another one of the different frequency bands that is different from the one of the different frequency bands.

3. The base station according to claim 2,
wherein in a case where the plurality of use channels are included in an identical frequency band, the transmitter transmits the downlink signal in the transmission interval of the downlink signal, using all the plurality of use channels, and the receiver does not receive the uplink signal in the transmission interval of the downlink signal.

4. The base station according to claim 2,
wherein in a case where the plurality of use channels are included in mutually different frequency bands and the transmitter is to transmit identification information on at least one of the plurality of use channels to the terminal apparatus, the transmitter transmits the downlink signal including the identification information in a first transmission interval of the downlink signal, using at least two of the plurality of use channels.

5. The base station according to claim 4,
wherein the transmitter transmits, in a second transmission interval of the downlink signal, information indicating that the downlink signal is transmitted using the at least two of the plurality of use channels in the first transmission interval, the information being transmitted using the at least one of the plurality of use channels that is included in the one of the different frequency bands, the second transmission interval being a transmission interval ahead of the first transmission interval.

6. The base station according to claim 1,
wherein when the number of use channels included in a first frequency band is smaller than the number of use channels included in a second frequency band, the transmitter transmits the downlink signal, using all the plurality of use channels included in the first frequency band.

7. The base station according to claim 1,
wherein when the number of use channels included in a first frequency band is smaller than the number of use channels included in a second frequency band, the transmitter transmits the downlink signal, using all the plurality of use channels included in the second frequency band.

8. The base station according to claim 1, wherein in a case where at least three of the use channels are included in one of the frequency bands, the transmitter transmits the downlink signal, using one of the use channels, and transmits a null signal, using another one of the use channels that is adjacent to the one of the use channels, and the receiver receives the uplink signal, using still another one of the use channels that is not adjacent to the one of the use channels.

9. A communication method in which a base station and a terminal apparatus perform radio communication of a time-division-duplex scheme, using any of a plurality of channels included in each of a plurality of frequency bands, the method comprising the following performed by the base station:

selecting a plurality of use channels to be used for the radio communication;

transmitting a downlink signal to the terminal apparatus;

receiving an uplink signal from the terminal apparatus, and selecting whether transmitting the uplink signal in a transmission interval of the downlink signal using at least one of the plurality of use channels or receiving the downlink signal in the transmission interval of the uplink signal using at least another one of the plurality of use channels that is not adjacent to the at least one of the plurality of use channels, based on whether the plurality of use channels are included in different frequency bands or in the same frequency band.

* * * * *